US011326720B2

(12) United States Patent
Comalander

(10) Patent No.: US 11,326,720 B2
(45) Date of Patent: May 10, 2022

(54) PIPE SUPPORT STAND HAVING SADDLE, AND METHOD OF USE

(71) Applicant: Comalander Fabrication and Services, LLC, Beaumont, TX (US)

(72) Inventor: Christopher R. Comalander, Beaumont, TX (US)

(73) Assignee: Comalander Fabrication and Services, LLC, Beaumont, TX (US)

( * ) Notice: Subject to any disclaimer, the term of this patent is extended or adjusted under 35 U.S.C. 154(b) by 0 days.

(21) Appl. No.: 17/239,286

(22) Filed: Apr. 23, 2021

(65) Prior Publication Data

US 2021/0247000 A1     Aug. 12, 2021

Related U.S. Application Data

(60) Division of application No. 16/561,103, filed on Sep. 5, 2019, now Pat. No. 11,022,235, and a continuation-in-part of application No. 29/695,326, filed on Jun. 18, 2019, and a continuation-in-part of application No. 29/692,221, filed on May 23, 2019, and a continuation-in-part of application No. 29/692,204, filed on May 23, 2019.

(60) Provisional application No. 62/829,903, filed on Apr. 5, 2019.

(51) Int. Cl.
*F16L 3/16*     (2006.01)
*F16L 3/10*     (2006.01)

(52) U.S. Cl.
CPC ............... *F16L 3/16* (2013.01); *F16L 3/1091* (2013.01)

(58) Field of Classification Search
CPC . F16L 3/16; F16L 3/1091; F16L 3/223; F16L 3/26; F16L 3/1218
USPC ...... 248/49, 62, 65, 73, 74.1, 131, 146, 158, 248/161, 415
See application file for complete search history.

(56) References Cited

U.S. PATENT DOCUMENTS

| 2,684,222 | A | * | 7/1954 | Miller | F16L 3/1218 248/354.3 |
| 6,206,613 | B1 | * | 3/2001 | Elkins | F16L 3/26 405/172 |
| 9,682,759 | B1 | * | 6/2017 | Huntley | F16B 2/005 |
| 9,714,726 | B1 | * | 7/2017 | Laidley | F16L 3/223 |
| 2011/0215566 | A1 | * | 9/2011 | Stempo | F16L 27/0808 285/146.1 |
| 2016/0131280 | A1 | * | 5/2016 | Brown | B29C 65/48 29/525.11 |
| 2018/0347726 | A1 | * | 12/2018 | Anderson | F16M 11/28 |

(Continued)

*Primary Examiner* — Muhammad Ijaz
(74) *Attorney, Agent, or Firm* — Peter L. Brewer; Thrive IP

(57) ABSTRACT

A pipe support system includes a pipe base, a threaded stud having a head, a saddle supported above the pipe base, and a shoe removably nested along a concave upper surface of the saddle. Methods for installing the pipe support system include determining a height of a joint of pipe above a ground surface; selecting a length of pipe for the pipe base in accordance with the height of the joint of pipe above the ground surface, thereby making a macro-adjustment; and rotating a threaded stud relative to a stud housing in order to make a micro-adjustment to the height of t\he joint of pipe; and placing the joint of pipe onto the shoe, thereby supporting the pipe above the ground surface. A method for replacing the shoe when it becomes worn is also provided by reversing said installation.

21 Claims, 18 Drawing Sheets

(56) References Cited

U.S. PATENT DOCUMENTS

2020/0318760 A1\* 10/2020 Comalander ............ F16L 3/18

\* cited by examiner

PIPE SUPPORT STAND HAVING SADDLE, AND METHOD OF USE

CROSS REFERENCE TO RELATED APPLICATIONS

This application claims the benefit of U.S. Ser. No. 29/692,204 filed May 23, 2019. That application is entitled "Saddle and Insert for a Pipe Support System."

This application also claims the benefit of U.S. Ser. No. 29/692,221 filed May 23, 2019. That application is entitled "Saddle and Insert for a Pipe Support System."

This application further claims the benefit of U.S. Ser. No. 29/695,326 filed Jun. 18, 2019. That application is entitled "Saddle and Insert for a Pipe Support System."

Still further, this application claims the benefit of U.S. Ser. No. 62/829,903 filed Apr. 5, 2019. That application is entitled "Pipe Support Stand Having Saddle, and Method of Use."

Each of these applications is incorporated herein in its entirety by reference.

STATEMENT REGARDING FEDERALLY SPONSORED RESEARCH OR DEVELOPMENT

Not applicable.

BACKGROUND OF THE INVENTION

This section is intended to introduce various aspects of the art, which may be associated with exemplary embodiments of the present disclosure. This discussion is believed to assist in providing a framework to facilitate a better understanding of particular aspects of the present disclosure. Accordingly, it should be understood that this section should be read in this light, and not necessarily as admissions of prior art.

Field of the Invention

The present invention relates generally to pipe support structures for holding joints of pipe or sections of pipeline above a ground surface. More specifically, the invention relates to a pipe support system that is adjustable so as to accommodate pipe joints having varied heights or positions above a ground surface.

Technology in the Field of the Invention

Pipeline transport involves the transportation of fluids. Such fluids may include brine, potable water or sewage. Such fluids may also include unrefined liquid hydrocarbons, hydrocarbons in gaseous state, refined hydrocarbons, or components separated from produced hydrocarbons such as sulfuric components and carbon dioxide.

Pipelines are made up of a series of pipe joints connected end to end. In many cases, pipelines are installed above ground. Such elevated pipelines are frequently supported by a series of stanchions (also known as pipe support stands) that are spaced apart along a length of the pipeline. These stanchions rise from the ground to support the pipeline a predetermined distance above the surface. Frequently, the distance is only one to three feet.

During use, the pipe joints along a pipeline will experience fluctuations in temperature. This is due to a combination of changes in ambient outdoor temperature and changes in the temperature of the fluids being transported. Temperature fluctuations will inevitably cause portions of the pipeline to expand and contract. Some temperature fluctuations will occur abruptly, for example, over a matter of hours. This may occur due to short term changes in weather or due to the 24-hour solar cycle. Other changes may occur over longer periods of time, for example, due to changes in season or changes in fluid composition within the pipe.

The temperature fluctuations experienced along a pipeline are typically non-uniform across the length of the pipeline. This leads to a situation where some portions of the pipeline will expand or contract to a greater degree than other portions. The effects of thermal expansion and contraction on a pipeline will often be most pronounced along sections of pipe that periodically flow relatively hot or cold fluids.

Thermal expansion and contraction causes a pipeline to extend or retract in axial length. This, in turn, causes frictional wear as the pipeline rubs against the pipe support structure. Pipeline stanchions may incorporate lower-friction bearing surfaces that permit the overlying pipeline to slide relative to the stanchion. Beneficially, this can reduce the occurrence of bending, buckling, and jumping caused by an expanding or contracting pipe joint. For example, a pair of aluminum or polished stainless steel plates may be welded to the bottom of a pipe shoe and the top of a pipe stanchion, to face one another during use and to permit relative angular movement as well as axial movement between the stanchion and pipeline. In other examples, one of the plates may be replaced with a ceramic or a polytetrafluoroethylene (PTFE) plate.

In any instance, it is necessary to monitor the condition of pipe support structures to ensure that the bearing surfaces are in good condition not only to support a pipe section but also to accommodate thermal expansion/contraction. Unfortunately, replacing bearing plates is time consuming and expensive. Further, each pipe stand will require a unique height to support the pipe joints above the ground. In this respect, the ground surface is never perfectly horizontal along a pipeline length and it may be necessary to adjust the position of the pipe relative to the ground to at least a small extent.

Therefore, a need exists for an improved pipe support system for holding a pipe above a ground surface, wherein the bearing plate can be easily installed, and then later can be easily removed and replaced. A need further exists for a pipe support system that may be adjusted so as to accommodate height above the ground for pipe joints or sections of a pipeline. Still further, a need exists for a pipe support structure that allows for longitudinal movement of the pipe once it is set onto the pipe support structure, and wherein a bearing plate can be replaced without disassembling the pipeline or supporting stanchion.

BRIEF SUMMARY OF THE INVENTION

A pipe support system is first provided herein. In one aspect, the pipe support system first comprises a pipe base. The pipe base preferably defines a tubular body supported by a base plate. The tubular body may have a circular cross-section or a polygonal cross-section. In either instance, the tubular body has a defined length chosen for supporting a pipe a selected distance above a ground surface.

In one aspect, the pipe support system comprises a plurality of tubular bodies, with each tubular body having a different length. This allows the operator to select a tubular body with a desired length, thereby making macro-adjustments to the height of a joint of pipe above the ground surface.

The pipe support system also includes a stud assembly. The stud assembly comprises an adjustable stud and a stud housing. In one embodiment, the adjustable stud is a threaded bolt having a head. The bolt is threadedly received within a central opening of the stud housing. Preferably, the stud housing is in the form of a nut, and includes a flanged outer surface. The stud housing is configured to land in and to mate with an inner diameter of the tubular body. At the same time, the flanged outer surface is dimensioned to gravitationally land onto an upper end of the tubular body.

The pipe support system also includes a saddle. The saddle defines a concave body configured to receive the pipe. The saddle preferably provides between 90° and 180° of radial support.

Nested along a concave surface (or inner diameter) of the saddle is a removable shoe. The shoe likewise defines a concave body and also provides between 90° and 180° of support for the pipe. The shoe serves as a replaceable bearing plate. In one embodiment, the shoe includes downwardly facing shoulders on opposing sides of the concave shoe. The shoulders are dimensioned to straddle the saddle. In this way, the shoe will not slide off of the saddle in response to thermal expansion or contraction along the pipeline.

Finally, the pipe support structure comprises a receptacle. The receptacle resides below the saddle and is configured to receive a non-threaded head of the stud. In one aspect, the receptacle has a polygonal inner diameter, and the non-threaded head comprises a polygonal body dimensioned to mate with the polygonal inner diameter. In a more preferred aspect, the receptacle has a circular inner diameter, and the non-threaded head comprises a circular body dimensioned to mate with the polygonal inner diameter. In this instance, the bolt can be turned relative to the receptacle, allowing micro-adjustments to be made to the height of a pipeline section.

A key may extend through the receptacle to engage the non-threaded head, or alternatively to engage a collar or an annular groove below the head. This causes the saddle and the stud to rotate together. Of course, the key may be removed so that micro-adjustments may be made to the height of the saddle above the ground surface before or after the pipe is installed.

A method of supporting a section of pipe is also provided herein. In one embodiment, the method first comprises providing a pipe support system. The pipe support system may be in accordance with the pipe support system described above in its various embodiments. For example, the pipe support system may include:
- a pipe base;
- a stud assembly having a flanged housing and a threaded bolt having a non-threaded head;
- a saddle supported above the pipe base, the saddle having a concave upper surface and a receptacle along a lower surface for receiving the head; and
- a shoe removably nested along the concave upper surface of the saddle.

The method also includes determining a height of a joint of pipe above a ground surface. Additionally, the method comprises selecting a length of the pipe base in accordance with the height of the joint of pipe above the ground surface.

The method further includes slidably placing the threaded bolt into an inner diameter of the pipe base until the flanged housing is landed onto a top of the pipe base. Further, the method includes landing the receptacle of the saddle onto the head of the threaded stud so that the saddle and nested shoe are supported above the pipe base.

The method also includes rotating the head of the bolt relative to the stud housing in order to provide micro-adjustments to the height of the saddle relative to the pipe base. The method also comprises placing the joint of pipe onto the saddle and shoe, thereby supporting the pipe above the ground surface. This step may be done either before or after the head of the threaded stud is rotated relative to the stud housing.

Optionally, a key is provided to place the saddle and the threaded stud in fixed relation. When the key is not provided, the stud is able to rotate to make micro-adjustments to the height of the supported pipe even after the pipe is landed in the saddle.

In a preferred arrangement of the method, the saddle defines a concave body configured to receive the pipe. The saddle preferably provides from 90° to 180° of radial support. As noted, the pipe support structure further comprises a removable shoe nested along an inner diameter of the saddle. The shoe likewise defines a concave body and also provides between 90° and 180° of support for the pipe. In one embodiment, the shoe includes downwardly facing shoulders on opposing sides of the concave shoe. The shoulders are dimensioned to straddle the saddle. In this way, the shoe will not slide off in response to thermal expansion or contraction along the pipeline. The method then comprises placing the shoe onto the saddle prior to the step of landing a joint of pipe or a section of pipeline onto the saddle.

In one aspect, the pipe base defines a vertically-oriented tubular body supported by a base plate. The method may further comprise selecting a tubular body having a desired length for supporting the pipe above the ground surface.

The method may further comprises removing the shoe upon observing that it has become worn, and replacing the worn shoe with a new shoe. This may generally be done by rotating the bolt relative to the stud housing in an opposite direction so as to lower the saddle away from the supported pipe.

DESCRIPTION OF THE DRAWINGS

So that the manner in which the present inventions can be better understood, certain illustrations, charts and/or flow charts are appended hereto. It is to be noted, however, that the drawings illustrate only selected embodiments of the inventions and are therefore not to be considered limiting of scope, for the inventions may admit to other equally effective embodiments and applications.

DETAILED DESCRIPTION OF SELECTED SPECIFIC EMBODIMENTS

Figure 1A:
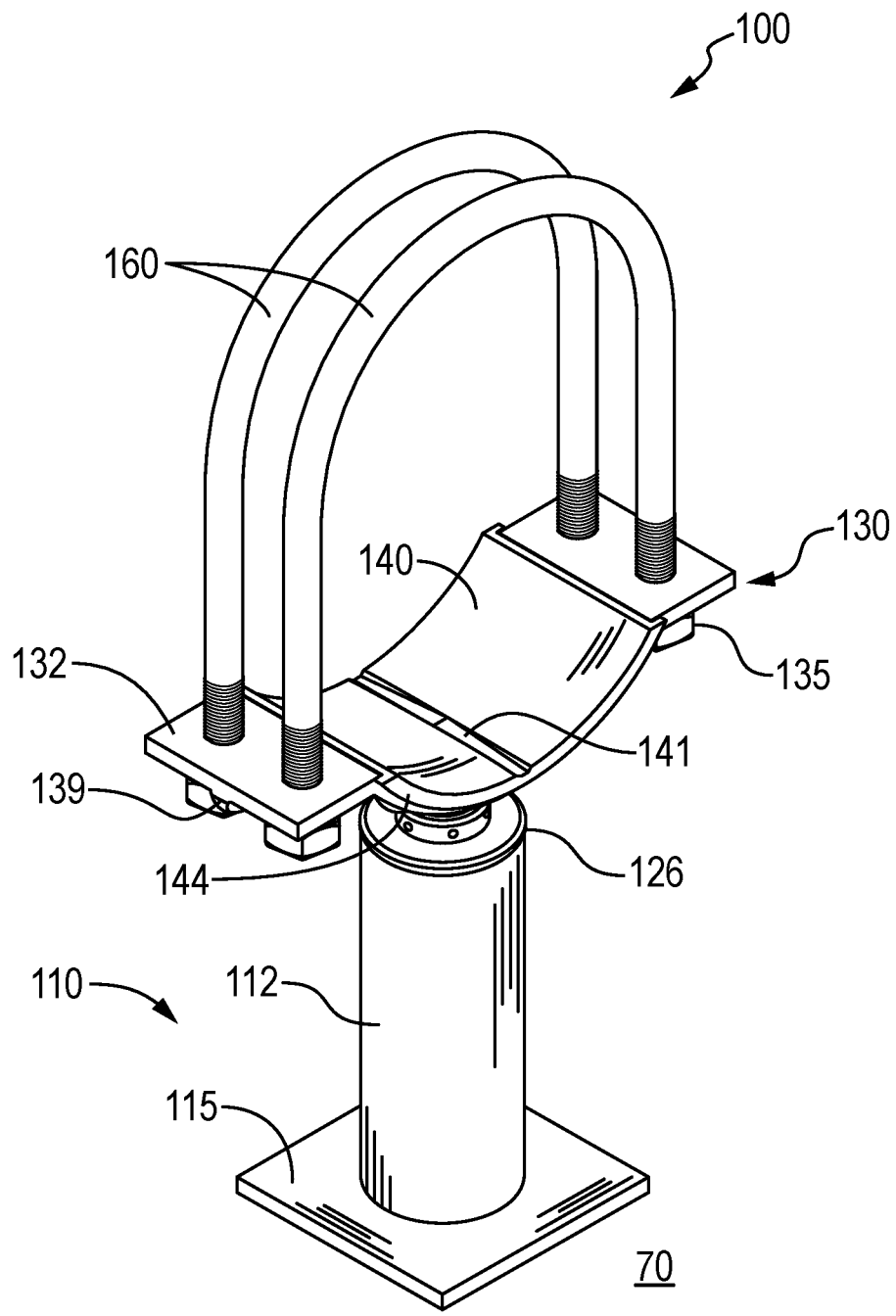
FIG. 1A is a top perspective view of the pipe support system of the present invention, in one embodiment.
Figure 1B:
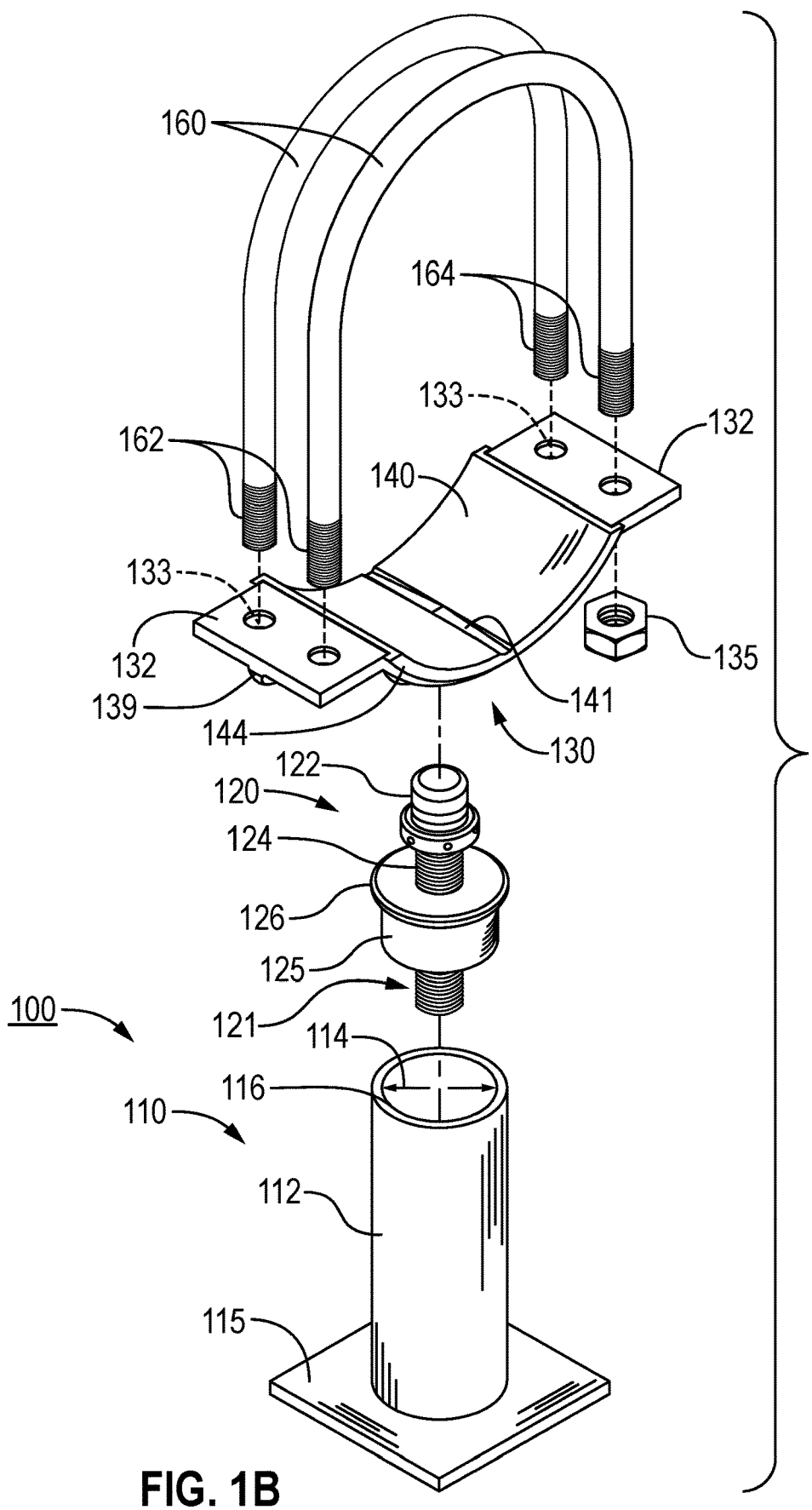
FIG. 1B is another perspective view of the pipe support system as in FIG. 1A. Here, parts of the pipe support system are shown in exploded-apart relation.

Certain novel features believed characteristic of the embodiments of the present application are set forth in the appended claims. However, the embodiments themselves and further objectives and advantages thereof, will best be understood by reference to the following detailed description when read in conjunction with the accompanying drawings, wherein:

FIG. 1A is a perspective view of the pipe support system 100 of the present invention, in one embodiment. FIG. 1B is another perspective view of the pipe support system 100. Here, parts of the pipe support system 100 are shown in exploded-apart relation for illustrative purposes. The pipe support system 100 will be generally described with reference to FIGS. 1A and 1B together.

The pipe support system 100 first includes a pipe base 110. The pipe base 110 preferably defines a tubular body 112 supported by a base plate 115. The tubular body 112 may have a circular cross-section or a polygonal cross-section. In either instance, the tubular body 112 has a defined length chosen for supporting a pipe (shown at 400 in FIG. 4) a selected distance above a ground surface.

In one aspect, the pipe support system 100 comprises a plurality of tubular bodies 112, with each tubular body 112 having a different length. This allows the operator to select a tubular body 112 with a desired length, thereby making macro-adjustments to the height of a joint of pipe 400 supported above the ground surface.

Figure 2A:
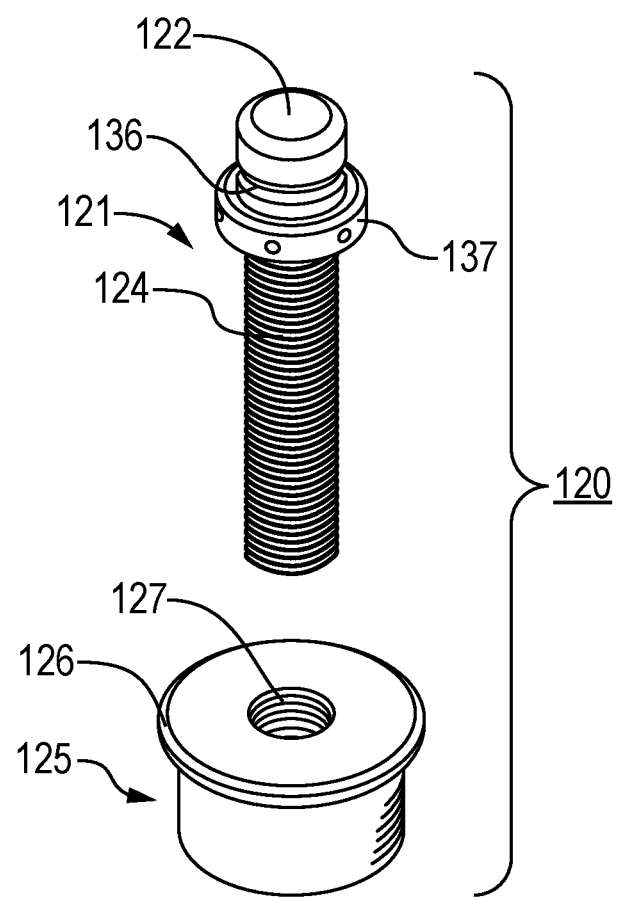
FIG. 2A is an enlarged perspective view of the threaded stud (or bolt) and adjustable stud housing of FIGS. 1A and 1B. In this view, the bolt and stud housing (together, the "stud assembly") are shown in exploded-apart relation.

The pipe support system 100 additionally includes an adjustable stud assembly 120 (indicated in FIG. 2A). In one embodiment, the adjustable stud assembly 120 includes an adjustable stud 121, which may be a threaded bolt having a non-threaded head 122, and a stud housing 125. The bolt 121 (with threaded portion 124) is threadedly received within the stud housing 125. Preferably, the stud housing 125 is in the form of a nut, but with a flanged outer surface 126. As shown, an outer diameter of the stud housing 125 is configured to land in and to mate with (or be closely received by) an inner diameter 114 of the tubular body 112. At the same time, the flanged outer surface 126 is dimensioned to land onto an upper end 116 of the tubular body 112.

The pipe support system 100 may also include at least one pipe support clamp 160. In the exemplary arrangement of FIGS. 1A and 1B, a pair of pipe support clamps 160 is shown. Each pipe support clamp 160 has a first threaded end 162 and a second threaded end 164, forming a U-bolt. The threaded ends 162, 164 are dimensioned to be inserted into respective openings 133 residing in flanges 132.

The pipe support system 100 also includes a saddle 130. The saddle 130 serves as a base for supporting a pipe joint 400. The saddle 130 defines a concave surface dimensioned to receive the pipe joint 400, and then opposing flanges 132 extending away from the concave surface. Thus, the flanges 132 are part of the saddle 130.

As shown best in FIG. 1B, nuts 135 may be used to secure each of the U-bolts 160 to the flanges 130. The nuts 135 reside at each of the first and second threaded ends 162, 164 to secure the pipe support clamps 160 to the saddle 130, and more particularly, to secure the pipe 400 (as in FIG. 4) between the clamps 160 and the saddle 130.

Also shown in FIGS. 1A and 1B is a rib 139. The rib 139 is formed underneath the saddle 130 and extends out under the respective flanges 132. The rib 139 is an optional structural element provided to bear loads and dampen axial and transverse forces as fluid flows through the pipe 400.

Figure 2B:
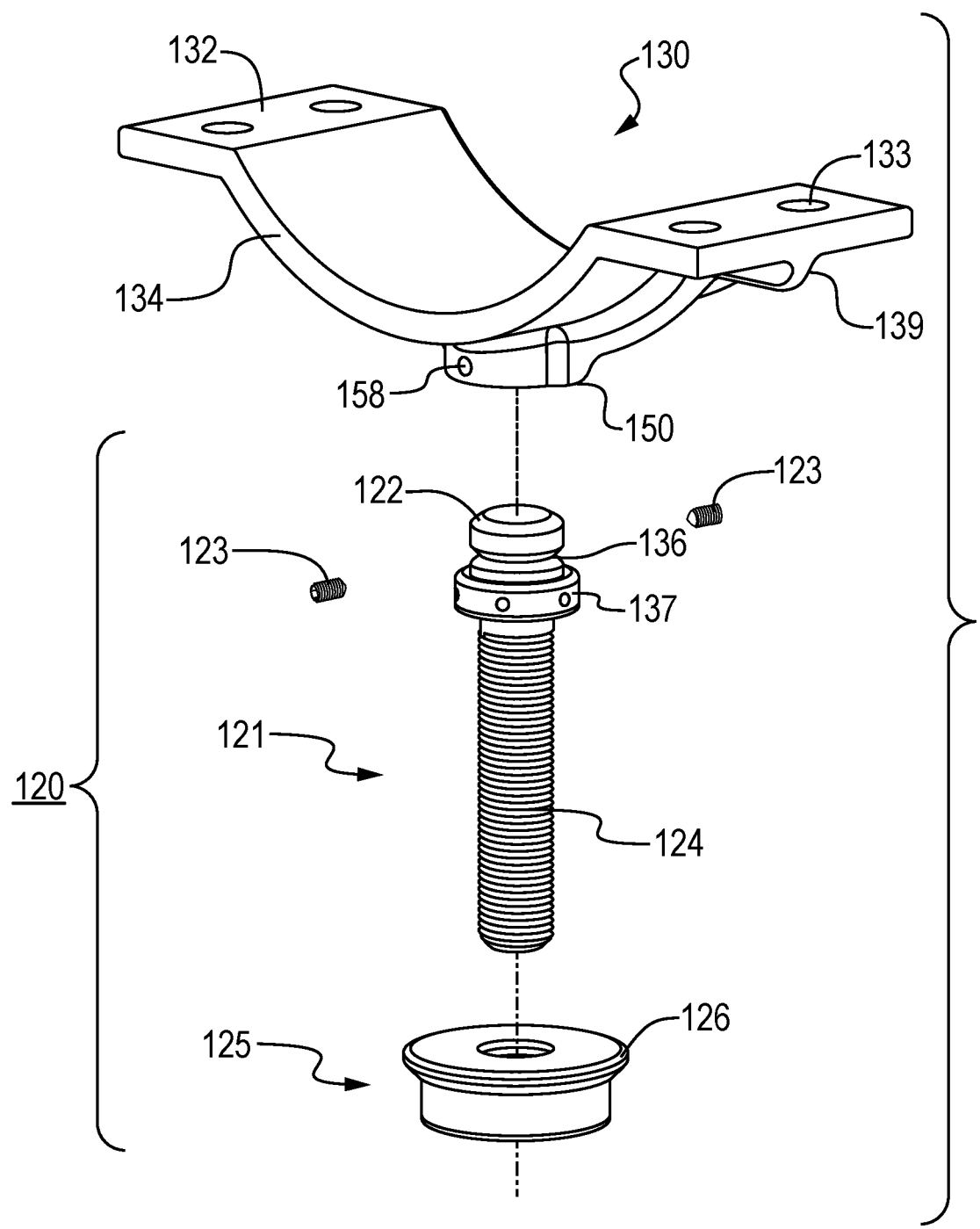
FIG. 2B is another enlarged perspective view of the stud assembly. A saddle is shown exploded away from the stud assembly.
Figure 2C:
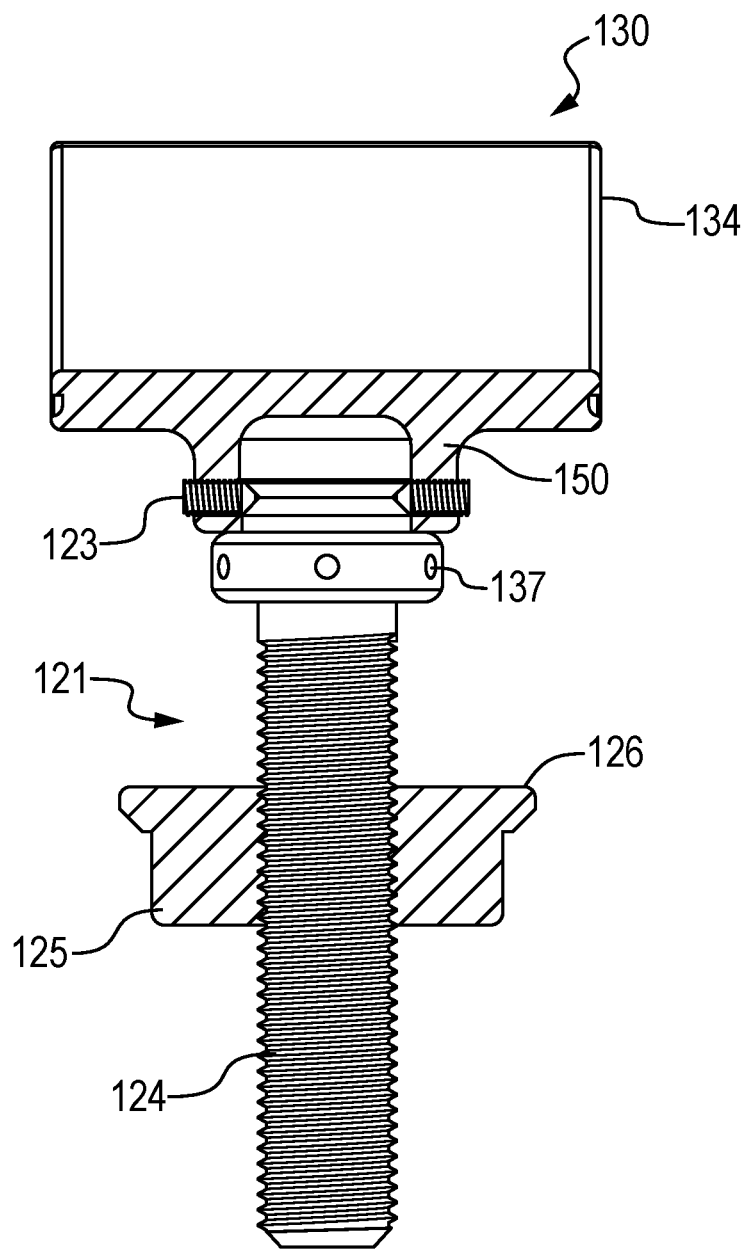
FIG. 2C is a side, cross-sectional view of the stud assembly and saddle of FIG. 2B.
Figure 2D:
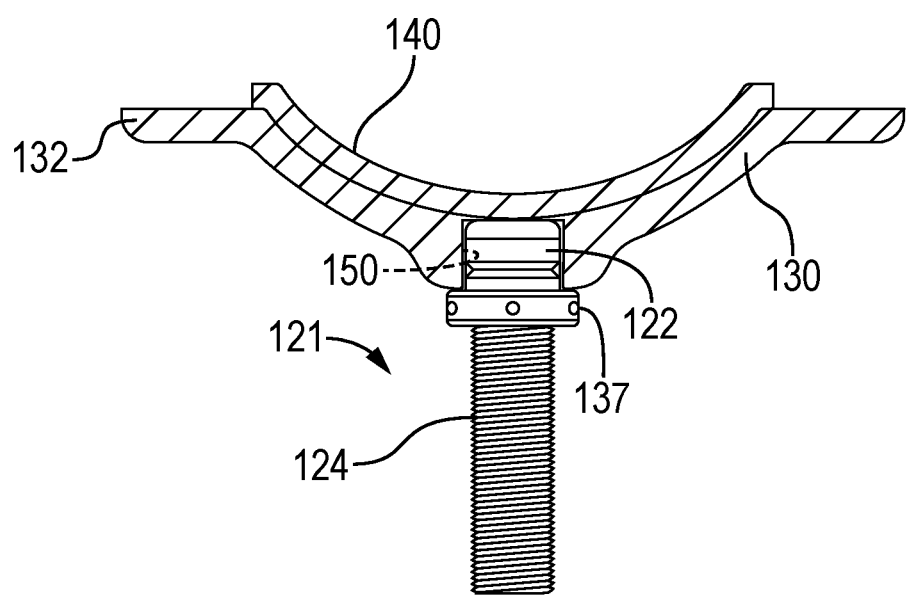
FIG. 2D is a front, cross-sectional view of the stud assembly and saddle of FIG. 2B. Here, the head of the threaded stud has received a receptacle of the saddle.

Central to the saddle 130, and residing underneath the concave surface, is a receptacle (seen at 150 in FIGS. 2B, 2C and 2D). The receptacle 150 may be an opening within a body of the saddle 130, having a circular profile. In one aspect, the rib 139 may comprise two separate rib portions, with each rib portion extending out from the receptacle 150 and towards the opposing flanges 132.

FIG. 2A is an enlarged perspective view of the threaded stud 121 and adjustable stud housing 125 of FIGS. 1A and 1B. In this view, the threaded stud 121 and stud housing 125 (together, the "stud assembly" 120) are shown in exploded-apart relation. Complementary threads 127 are shown in the stud housing 125 for receiving the threads 124 of the bolt 120.

Of interest, the stud assembly 120 includes a collar 137. The collar 137 defines an area of enlarged outer diameter, and is configured to gravitationally support the saddle 130. The collar 137 resides below the head 122.

The stud assembly also includes an annular groove 136. The annular groove 136 represents an area of reduced diameter, and resides between the head 122 and the collar 137. As shown in FIGS. 2B and 2C, the annular groove 136 receives threaded keys 123.

FIG. 2B is another enlarged perspective view of the stud assembly 120. In this view, the stud 121 remains exploded apart from the stud housing 125. In addition, keys 123 are shown exploded away from the annular groove 136. The keys 123 are configured to extend through apertures 158 in the receptacle 150.

In FIG. 2B, a saddle 130 is shown exploded away from the stud assembly 120. One of the rib portions 139 is visible in this view. Also visible is the receptacle 150. The receptacle 150 represents a lower portion of the saddle 130, and defines an opening dimensioned to gravitationally land on the head 122. More specifically, the receptacle 150 lands on the collar 137.

As noted, the receptacle 150 comprises two or more apertures 158 equi-radially placed around the receptacle 150. The apertures 158 receive the threaded keys 123. As the keys 123 are tightened into the apertures 158, the keys 123 will engage the annular groove 136, preventing relative movement between the stud 121 and the stud housing 125. The keys 123 also help to centralize the head 122 within the receptacle 150.

FIG. 2C is a side, cross-sectional view of the stud assembly 120 and saddle 130 of FIG. 2B. Here, the threaded set screws, or keys 123, extend through the apertures 158 in the receptacle 150. When run through the apertures 158, the keys 123 engage the non-threaded head 122. When the keys 123 are in place, the saddle 130 and the stud 121 rotate together.

FIG. 2D is a front, cross-sectional view of stud assembly 120 and saddle 130 of FIG. 2B. Here, the head 122 of the threaded stud 121 has gravitationally received the receptacle 150 of the saddle 130. The receptacle 150 has actually landed on the collar 137 such that the collar 137 serves as a bearing surface for the receptacle 150. When the key 123 is removed, the stud 121 and collar 137 may rotate independent from the saddle 130 and shoe 140. In this way, micro-adjustments (following selection of a macro length of the tubular body 112) may further be made to the height of the saddle 130 above a ground surface 70.

Figure 2E:
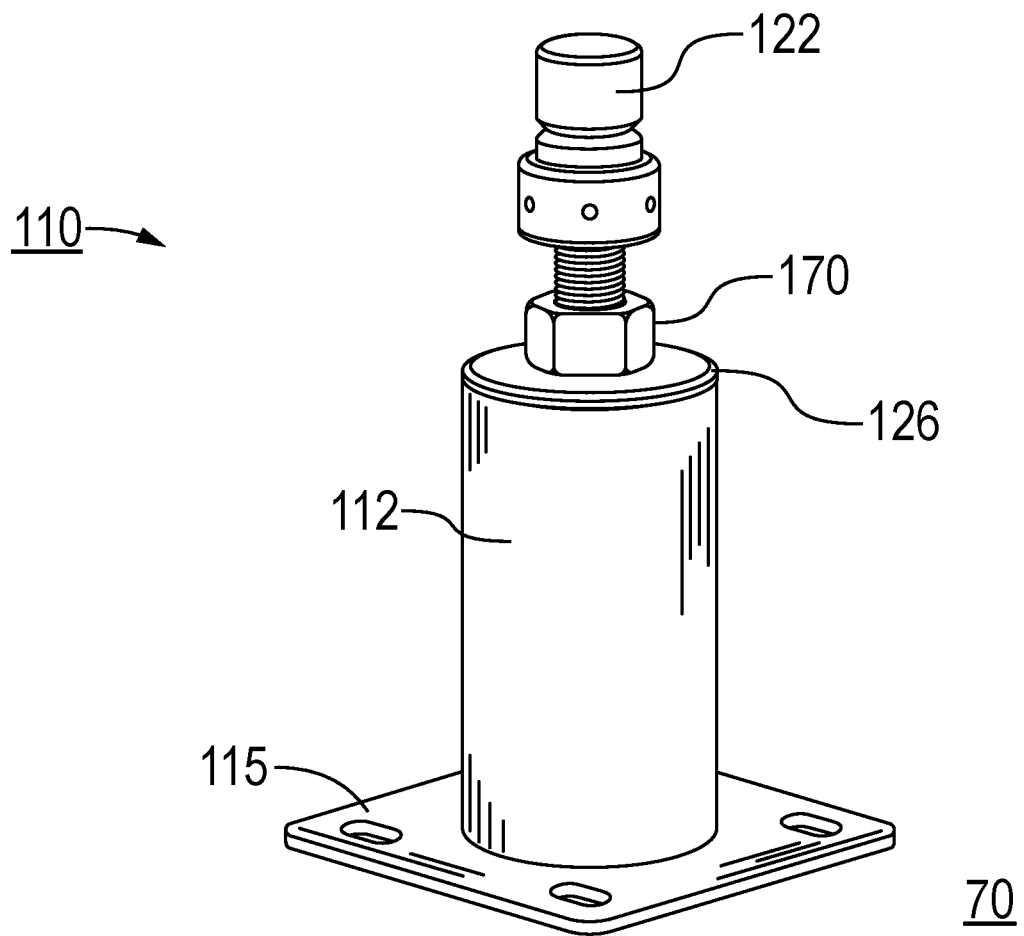
FIG. 2E is a perspective view of the pipe support system as in FIG. 1A, in an alternate embodiment. In this view, the saddle, the shoe and the pipe clamps have been removed. A nut has been placed along the threaded bolt, locked on top of the stud housing.

FIG. 2E is a perspective view of the pipe support system 100 as in FIG. 1A, in an alternate embodiment. In this view, the saddle 130, the shoe 140 and the pipe support clamps 160 have been removed for illustrative purposes. It can be seen that a nut 170 has been placed along the threaded portion 124 of the bolt 121. The nut 170 has been tightened down (or locked) on top of the stud housing 125. Beneficially, the optional nut 170 prevents the bolt 121 from being able to raise or lower over time once it is set to elevation, such as in response to vibrations emanating from the pipeline 400 or from nearby pumps or processing equipment (not shown).

Figure 3A:
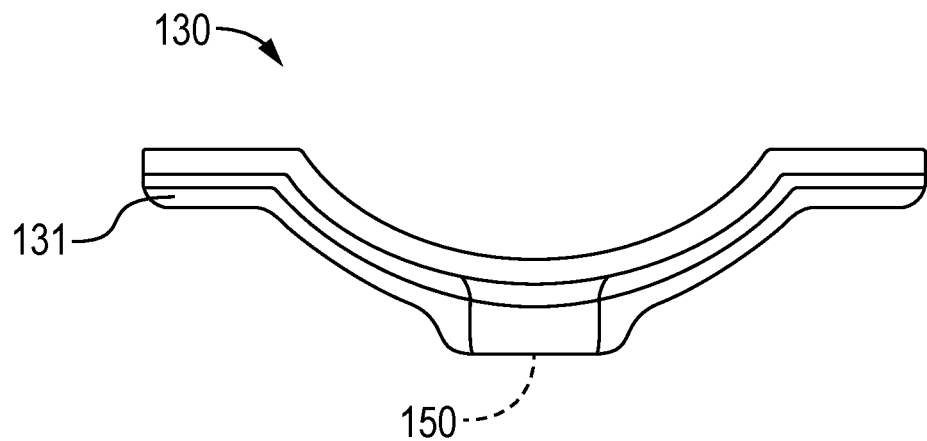
FIG. 3A is a front elevational view of the saddle of the pipe support system of FIGS. 1A and 1B, in one embodiment.
Figure 3B:
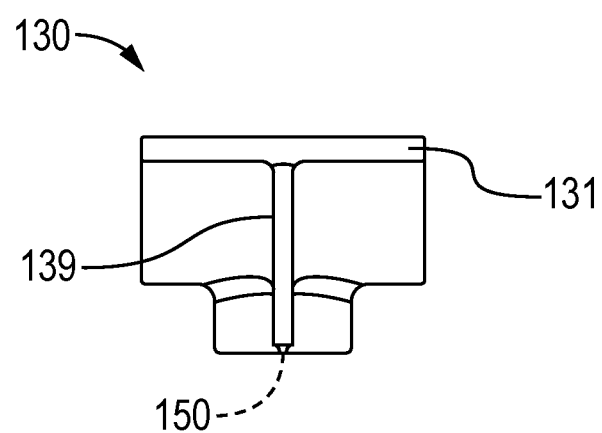
FIG. 3B is side elevational view of the saddle of the pipe support system of FIG. 3A.

FIG. 3A is front elevation view of the saddle 130 of the pipe support system 100 of FIGS. 1A and 1B. FIG. 3B is an end view of the saddle 130 of the pipe support system 100 of FIGS. 1A and 1B. As most clearly shown in FIG. 3A, the saddle 130 defines the concave body, which is configured to receive the pipe 400 as in FIG. 4. The saddle 130 preferably provides at least 120° of radial support.

The receptacle 150 is again shown, residing below the saddle 130. As noted, the receptacle 150 is configured to receive the non-threaded head 122 of the stud 121. In one aspect, the receptacle 150 has a polygonal inner diameter, and the non-threaded head 122 comprises a polygonal body dimensioned to mate with the polygonal inner diameter. In another aspect, with reference to FIGS. 2A through 2D, the receptacle 150 has a circular inner diameter, and the non-threaded head 122 comprises a circular body dimensioned to mate with and rotate within the inner diameter.

Also visible in FIG. 3B is the support joint, or rib 139. The support joint 139 provides lateral and torsional stability to the saddle 130 as it supports a pipe 400.

Figure 4:
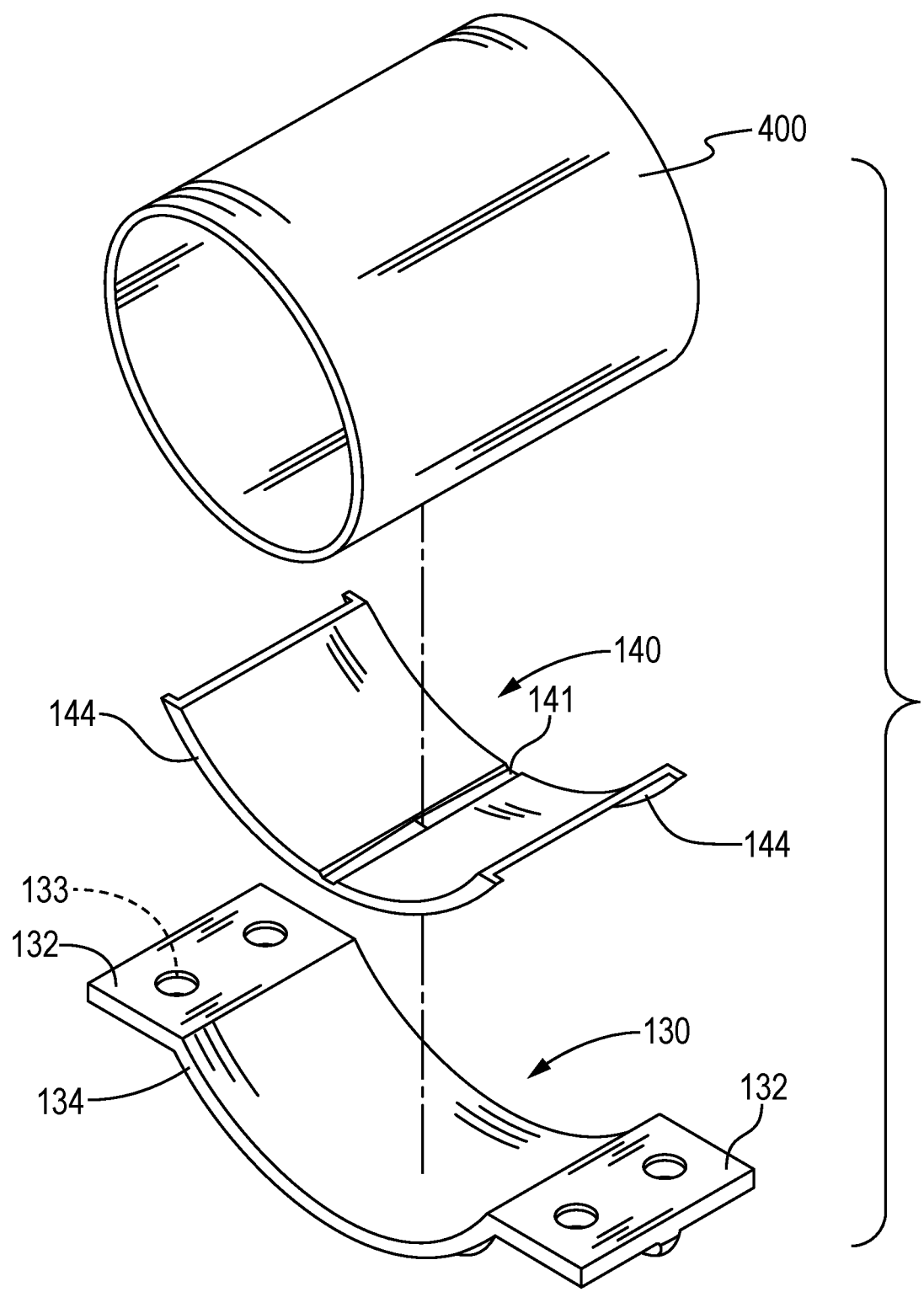
FIG. 4 is an enlarged perspective view of the saddle and nested shoe of FIGS. 1A and 1B. In this view, the saddle and shoe are shown with a partial section of pipe, in exploded-apart relation.

FIG. 4 is an enlarged perspective view of the saddle 130 of FIGS. 1A and 1B. In addition, the shoe 140 is shown. In this view, the saddle 130 and shoe 140 are shown in exploded-apart relation. In this arrangement, the shoe 140 includes a transverse channel 141. The channel 141 includes opposing angled surfaces configured to direct water or condensation away from the pipe 400.

In a preferred arrangement, the shoe 140 is fabricated from a polycarbonate material, polyurethane or a synthetic thermoplastic linear polyamide (or nylon). Nylon is preferred as it offers a combination of high strength and relatively low friction. One suitable example of a nylon material is Nylatron® GSM, available from Quadrant EPP USA Inc. of Reading, Pa. Nylatron® GSM contains finely divided particles of molybdenum disulphide ($MoS_2$) to enhance load bearing capabilities while maintaining the impact resistance inherent to nylon. Other Nylatron® products may also be considered. However, it is preferred that whatever plastic or other material is used, it should preferably have UV stabilizers.

Of importance, the shoe 140 is designed to be easily removed from the saddle 130. This allows the shoe 140 to be replaced when it begins to wear thin due to axial movement of the pipe 400. In this embodiment, the shoe 140 includes downwardly facing shoulders 144 on opposing sides of the concave shoe 140. The shoulders 144 are dimensioned to straddle complementary shoulders or edges 134 of the saddle 130. In this way, the shoe 140 will not slide off in response to thermal expansion or contraction along a pipeline.

FIG. 4 also schematically demonstrates a pipe 400 exploded above the shoe 140. It is understood that the present inventions are not limited by the type of pipe employed. The pipe 400 may be part of a pipeline used to convey fluids such as produced water, crude oil, brine, potable water, sewage or hydrocarbon gases. Produced hydrocarbons may be transported from the field into a gathering facility, a treatment facility or a refinery using the pipe 400. Processed fluids may be transported from a treatment facility or a refinery using the pipe 400.

Using the pipe support system 100 described above, a method of supporting a section of pipe is also provided herein. In one embodiment, the method first comprises providing a pipe support system. The pipe support system may be in accordance with the pipe support system 100 described above in its various embodiments. For example, the pipe support system may include:

a pipe base;

a stud assembly having a flanged housing and a threaded stud (or sturdy bolt) having a non-threaded head;

a saddle supported above the pipe base, the saddle having a concave upper surface and a receptacle along a lower surface for receiving the head; and a shoe removably nested along the concave upper surface of the saddle.

The method also includes determining a height of a joint of pipe above a ground surface. Additionally, the method comprises selecting a length of the pipe base in accordance with the height of the joint of pipe above the ground surface.

The method further includes slidably placing the bolt into an inner diameter of the pipe base until the flanged housing is landed onto a top of the pipe base. Further, the method includes landing the receptacle of the saddle onto the head of the bolt so that the saddle and nested shoe are supported above the pipe base.

The method also includes rotating the head of the threaded stud relative to the stud housing (or relative to the saddle) in order to provide micro-adjustments to the height of the saddle relative to the pipe base. Then, the method comprises placing the joint of pipe onto the shoe, thereby supporting the pipe above the ground surface.

Optionally, a key is provided to place the saddle and the bolt in fixed axial relation. When the key is not provided, the bolt is able to rotate to make micro-adjustments to the height of the supported pipe even after the pipe is landed in the saddle.

In a preferred arrangement of the method, the saddle defines a concave body configured to receive the pipe. The saddle preferably provides 90° to 180° of radial support. The pipe support structure further comprises a shoe nested along an inner diameter of the saddle. The shoe likewise defines a concave body and also provides between 90° and 180° (preferably about 120°) of support for the pipe. In one embodiment, the shoe includes downwardly facing shoulders on opposing sides of the concave shoe. The shoulders are dimensioned to straddle the saddle. In this way, the shoe will not slide off in response to thermal expansion or contraction along the pipeline.

In one aspect, the method comprises placing the shoe onto the saddle prior to the step of landing a joint of pipe or a section of pipeline onto the saddle.

In another embodiment, the method includes gravitationally landing the receptacle of the saddle onto a collar of the bolt, and then securing the saddle to the bolt in order to provide for a fixed rotational relation.

In one aspect, the pipe base defines a vertically-oriented tubular body supported by a base plate. The method may further comprise selecting a tubular body having a desired length for supporting the pipe above the ground surface.

After a period of time the bearing plates will experience wear. Accordingly, a method of replacing a bearing plate or shoe for a pipe support structure is provided herein. In one aspect, the method first comprises providing a pipe support system. The pipe support system is structure in accordance with the pipe support system 100 described above in its various embodiments. This includes a pipe base, a saddle, a shoe removably nested within the saddle, and a rotatable stud housing for supporting the saddle and nested shoe over the pipe base. The pipe support system also includes a pipe clamp placed over the joint of pipe. Beneficially, the pipe clamp is releasably attached to the saddle.

After a period of time, the method includes removing the shoe from the saddle. This may be done by:

rotating the rotatable stud in a first direction, thereby lowering the stud assembly, the saddle and the nested shoe away from the joint of pipe;

removing the worn shoe from the saddle;

replacing the worn shoe with a new shoe; and rotating the rotatable stud a second opposite direction, thereby raising the stud assembly, the saddle and the nested shoe into engagement with the joint of pipe.

Of interest, rotating the rotatable stud is done without the saddle and nested shoe also rotating. The method includes attaching the pipe clamps around the pipe and re-attaching them to the saddle with the shoe nested therein.

The method may further include running a key through an aperture in the receptacle until contact is made with the non-threaded head of the stud. Preferably, two or more keys are provided, with each key landing in an annular groove above a collar. The keys will axially and rotationally lock the head in place, allowing the stud to rotate with the saddle.

Figure 5A:
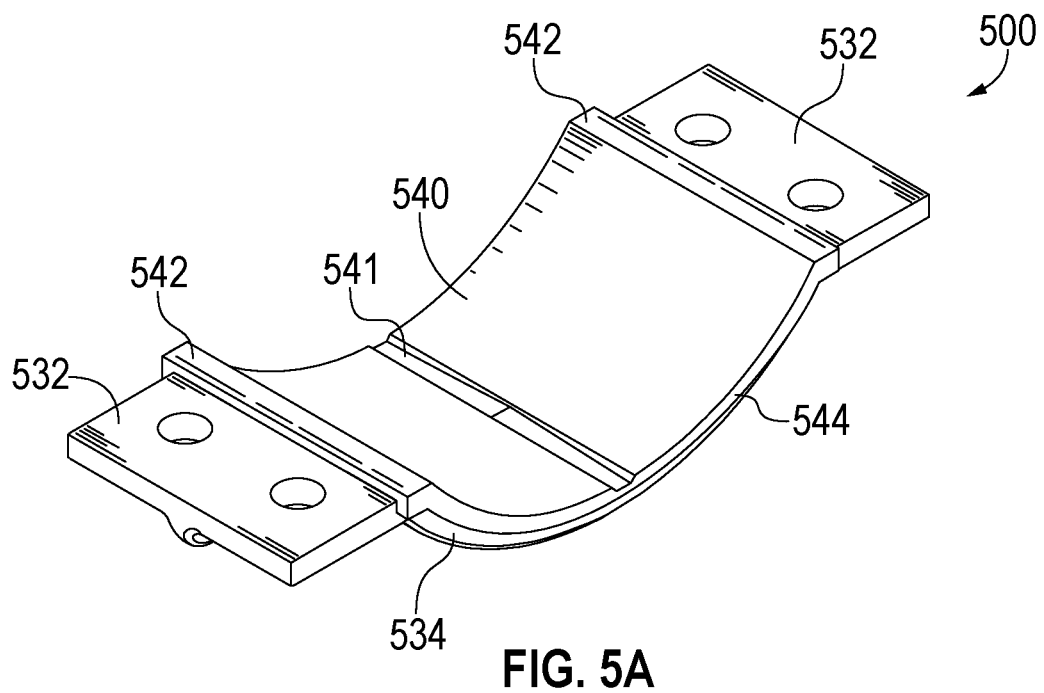
FIG. 5A is a perspective view of a shoe landed onto a saddle, in one embodiment. Here, the shoe includes opposing shoulders that hold the shoe on the saddle. End portions of the shoe extend out onto opposing flanges residing at corresponding ends of the saddle.

The particular embodiments disclosed above are illustrative only, as the embodiments may be modified and practiced in different but equivalent manners apparent to those skilled in the art having the benefit of the teachings herein. For example:

FIG. 5A is a perspective view of a saddle 530 and shoe 540 in an alternate embodiment. Here, the shoe 540 is nested in the saddle 530. The components are indicated together as 500. The saddle 530 and the shoe 540 each defines a concave body and provides between 90° and 180° of support for the pipe 400.

In the arrangement of FIG. 5A, the saddle 530 may be of the same design as the saddle 130 of FIGS. 1A and 1B. However, the shoe 540 offers a modified design wherein opposing ends 542 of the shoe 540 extend out partially onto planar flanged ends 532 of the saddle 530. In addition, shoulders are provided on opposing sides 544 of the shoe 540. The shoulders 544 extend down partially along opposing sides 534 of the saddle 530. Together, the extended ends 542 and the shoulders 544 hold the shoe 540 on the saddle 530.

Figure 5B:
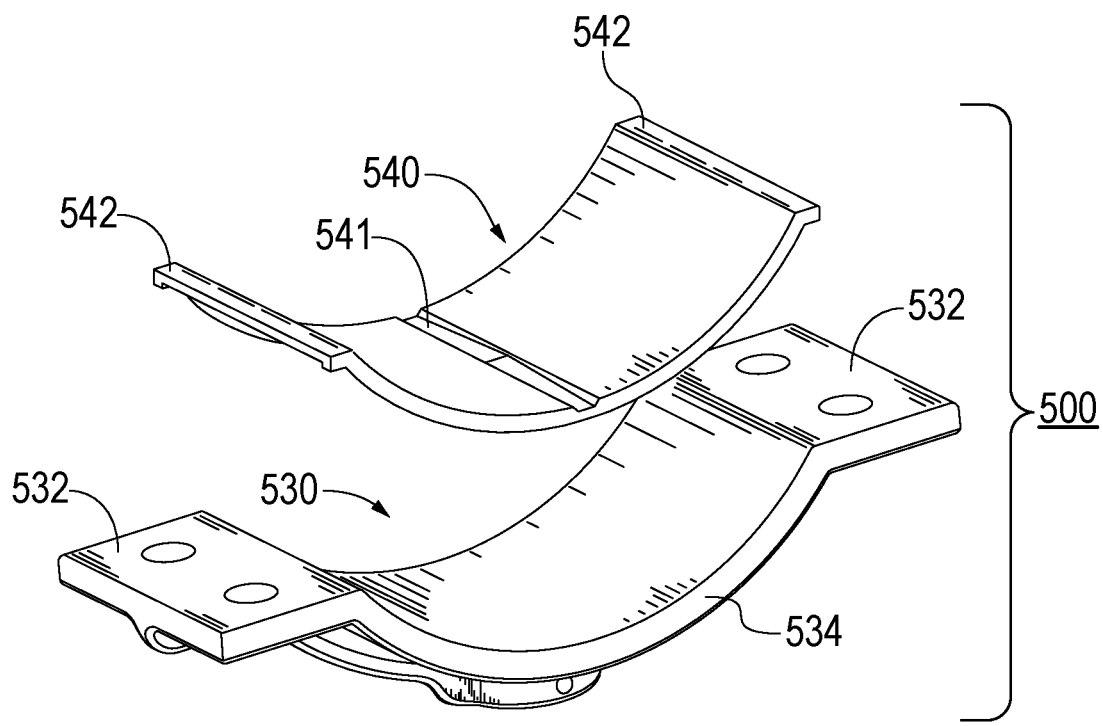
FIG. 5B is another perspective view of the shoe and saddle of FIG. 5A. Here, the components are seen in exploded-apart relation.

FIG. 5B is another perspective view of the shoe 540 and saddle 530 of FIG. 5A. Here, the components 500 are seen in exploded-apart relation. Of interest, the shoe 540 offers a single, central channel 541 that receives moisture, wicking the moisture away from a supported pipe joint 400.

Figure 6A:
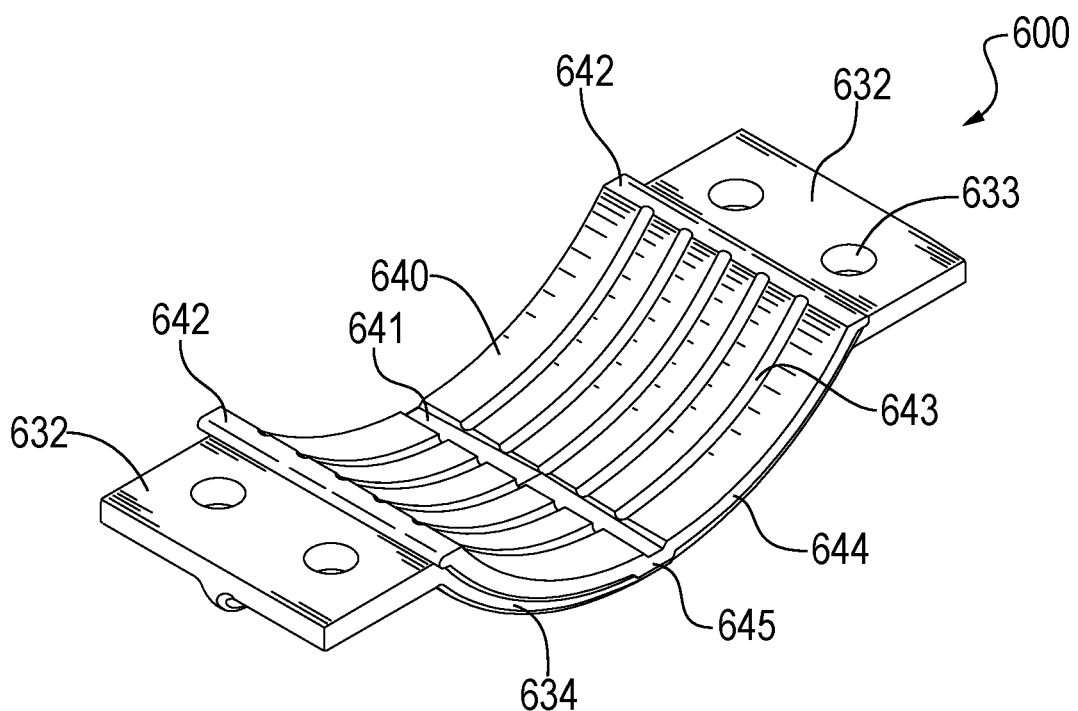
FIG. 6A is a perspective view of a shoe landed onto a saddle, in another embodiment. Here, the shoe includes a snap-lock feature on opposing sides of the shoe. This is provided in lieu of the opposing shoulders.

FIG. 6A is another perspective view of a shoe 640 landed onto a saddle 630. Here, the components are indicated together as 600.

In this arrangement, the saddle 630 may be of the same design as the saddle 130 of FIGS. 1A and 1B. However, the shoe 640 offers another modified design wherein a snap-lock tab 645 is provided on opposing sides 644 of the shoe 640. The tabs 645 are configured to snap into mating openings 635 placed along the opposing sides 634 of the saddle 630. When snapped into place, the tabs 645 hold the shoe 630 on the saddle 630, preventing the shoe 640 from sliding off of the saddle 630 laterally in the event of movement of a supported pipe joint.

Figure 6B:
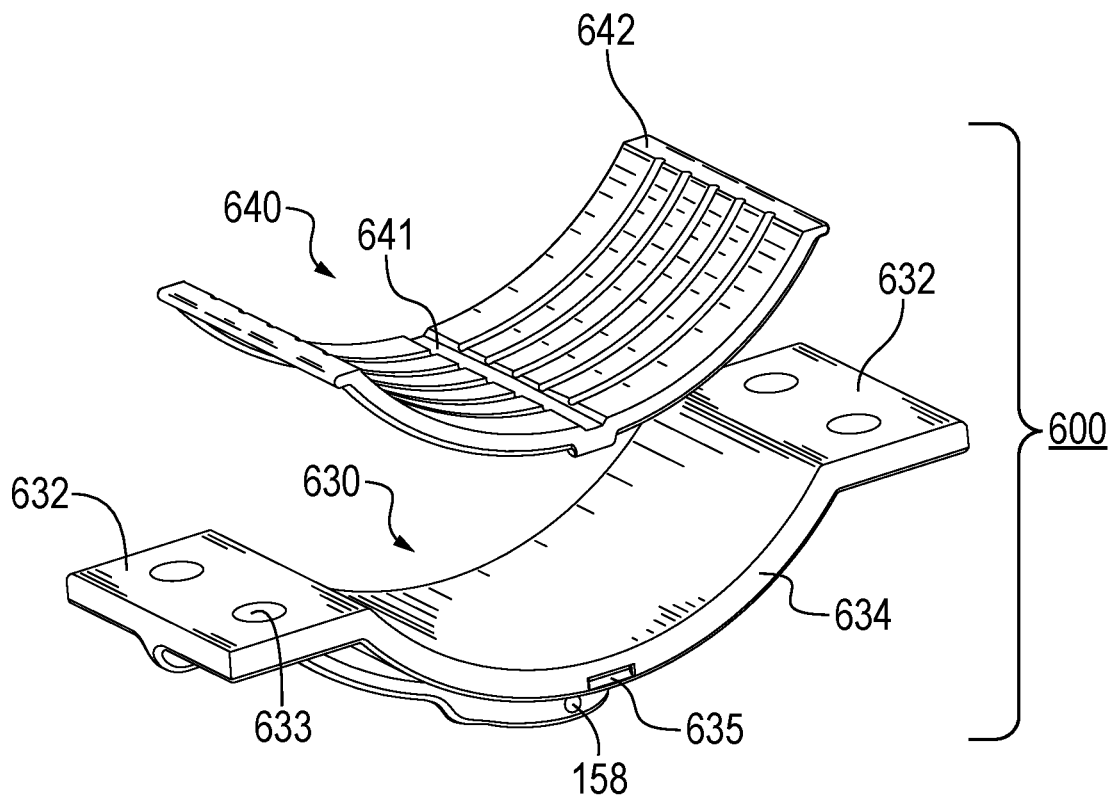
FIG. 6B is another perspective view of the shoe and saddle of FIG. 6A. Here, the components are seen in exploded-apart relation.

FIG. 6B is another perspective view of the shoe 640 and saddle 630 of FIG. 6A. Here, the components 600 are seen in exploded-apart relation. Of interest, the shoe 640 offers not only a central, transverse channel 641 that receives moisture, but also a series of parallel channels 643 that follow the concave curvature of the shoe 640. Together, the channels 641, 643 carry moisture away from a supported pipe joint 400.

It is also seen in FIG. 6B that the saddle 630 includes opposing flanges 632, with each flange 632 containing through-openings 633 for receiving U-bolts 160.

Figure 6C:
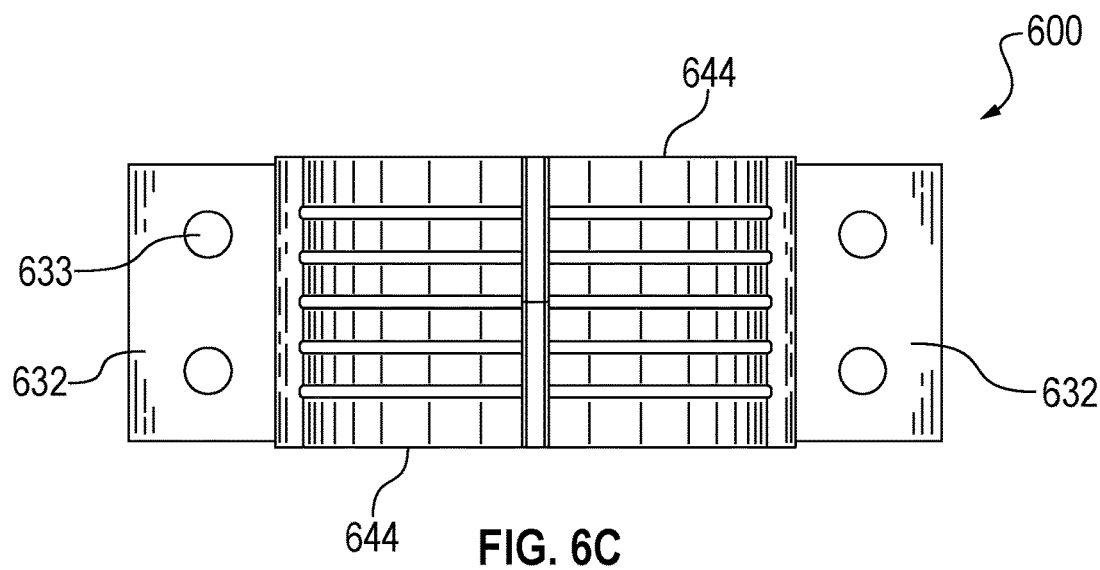
FIG. 6C is a top view of the shoe and saddle of FIG. 6A. Of interest, multiple channels are shown formed in the surface of the shoe.

FIG. 6C is a top view of the shoe and saddle 600 of FIG. 6A. Of interest, multiple channels 641, 643 are shown formed in the surface of the shoe 640.

Figure 6D:
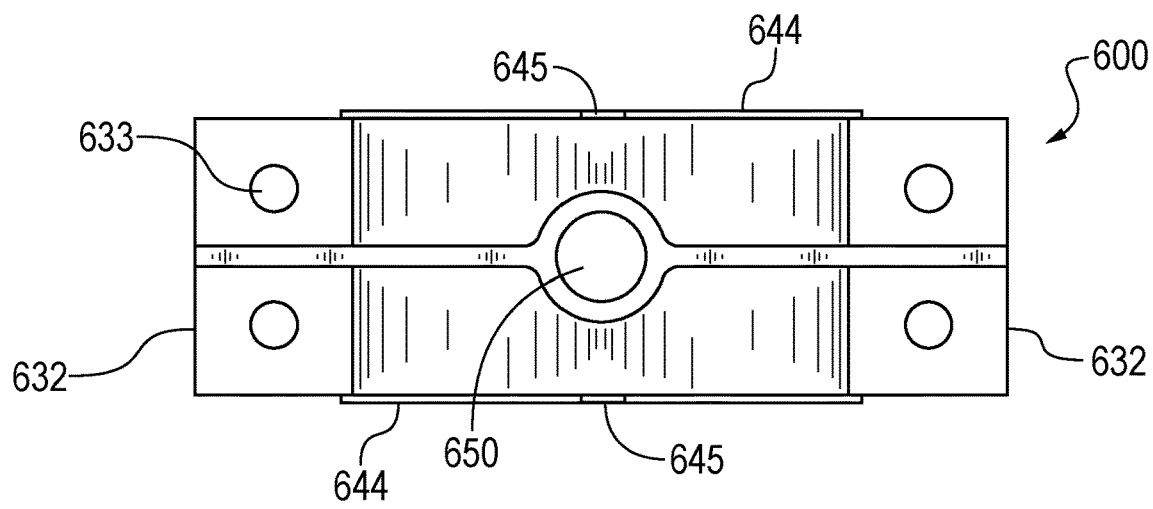
FIG. 6D is a bottom view of the shoe and saddle of FIG. 6A.

FIG. 6D is a bottom view of the shoe and saddle 600 of FIG. 6A. A receptacle 650 is visible in this view.

Figure 7A:
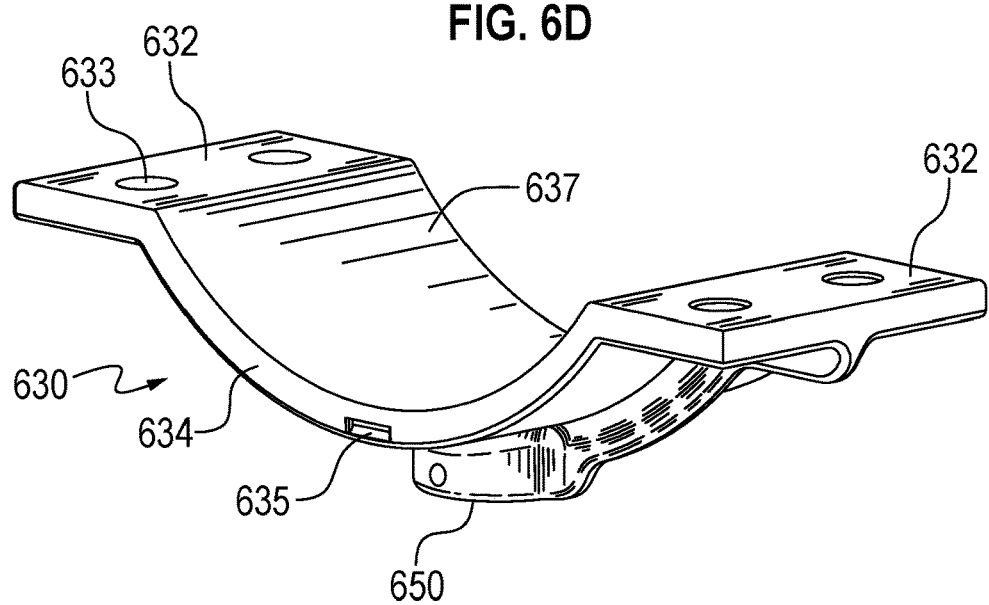
FIG. 7A is a first perspective view of the saddle of FIGS. 6A and 6B. An opening can be seen along a side of the saddle for receiving the snap-lock tab of the shoe.

FIG. 7A is a first perspective view of the saddle 630 of FIG. 6B. The saddle 630 is shown without the shoe 640 for illustrative purposes.

Figure 7B:
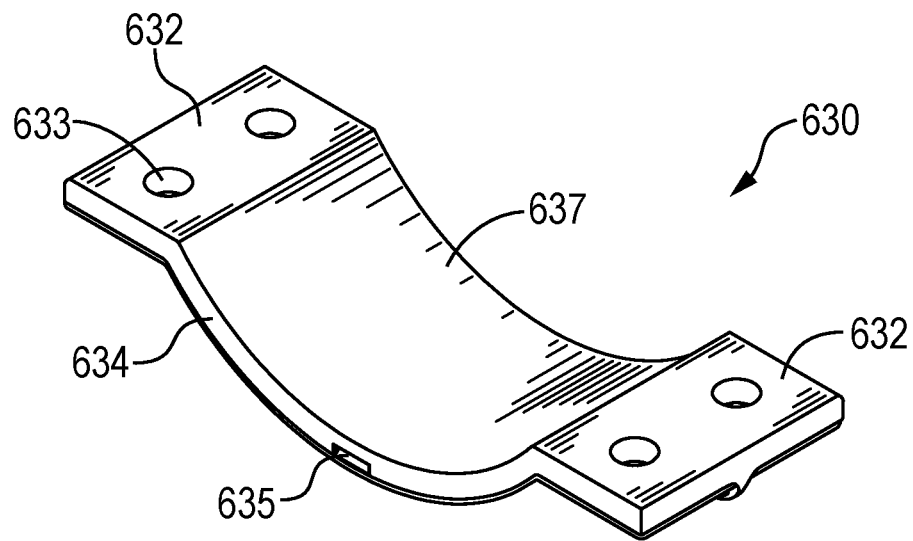
FIG. 7B is a second perspective view of the saddle of FIGS. 6A and 6B.

FIG. 7B is a second perspective view of the saddle 630 of FIGS. 6A and 6B.

Figure 7C:
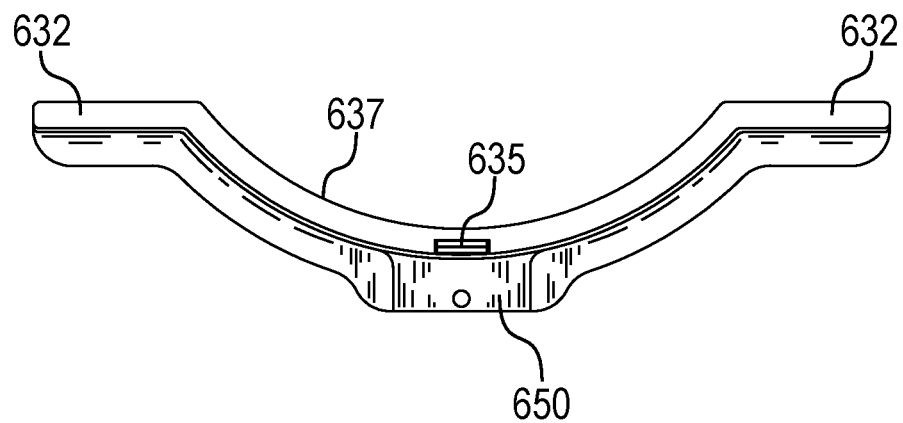
FIG. 7C is a side elevation view of the saddle of FIGS. 6A and 6B.

FIG. 7C is a side elevation view of the saddle 630 of FIGS. 6A and 6B.

Figure 7D:
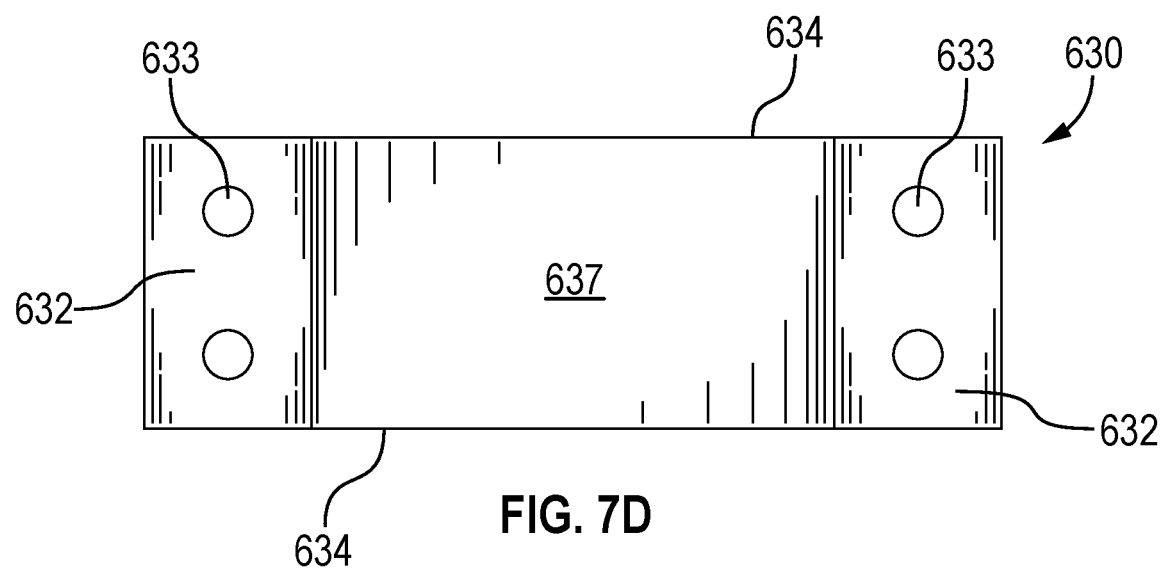
FIG. 7D is a top view of the saddle of FIGS. 6A and 6B.

FIG. 7D is a top view of the saddle 630 of FIGS. 6A and 6B. A top surface 637 of the saddle 630 is shown.

Figure 7E:
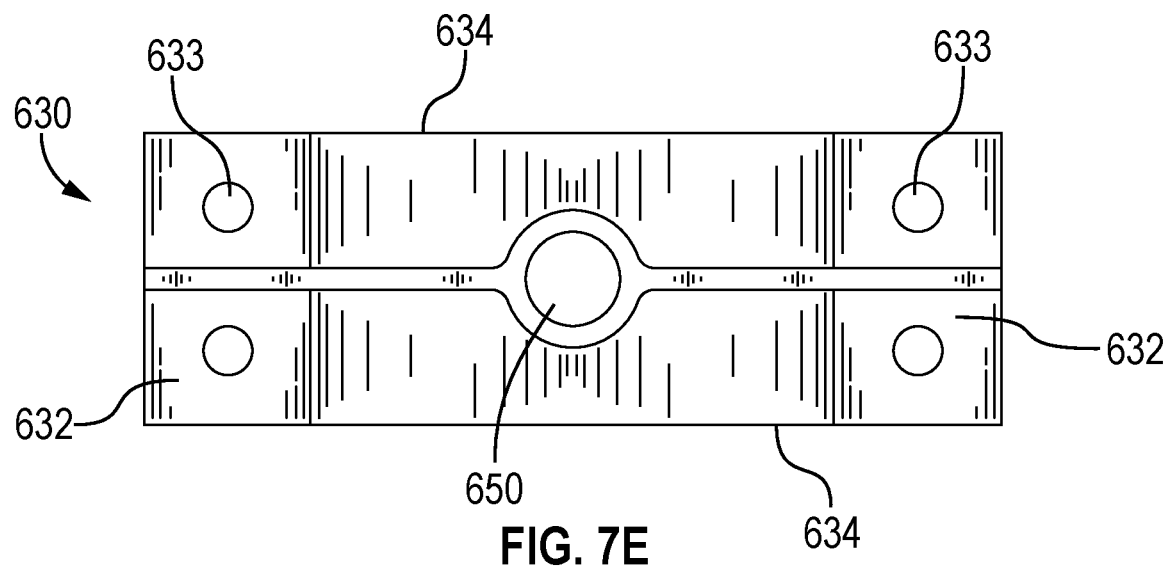
FIG. 7E is a bottom view of the saddle of FIGS. 6A and 6B.

FIG. 7E is a bottom view of the saddle 630 of FIGS. 6A and 6B.

Figure 7F:
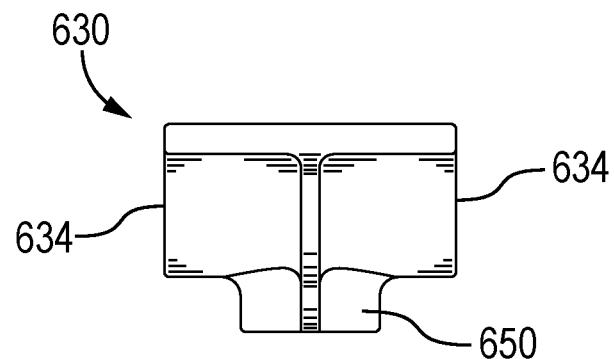
FIG. 7F is an end view of the saddle of FIGS. 6A and 6B.

FIG. 7F is an end view of the saddle 630 of FIGS. 6A and 6B.

Figure 8A:
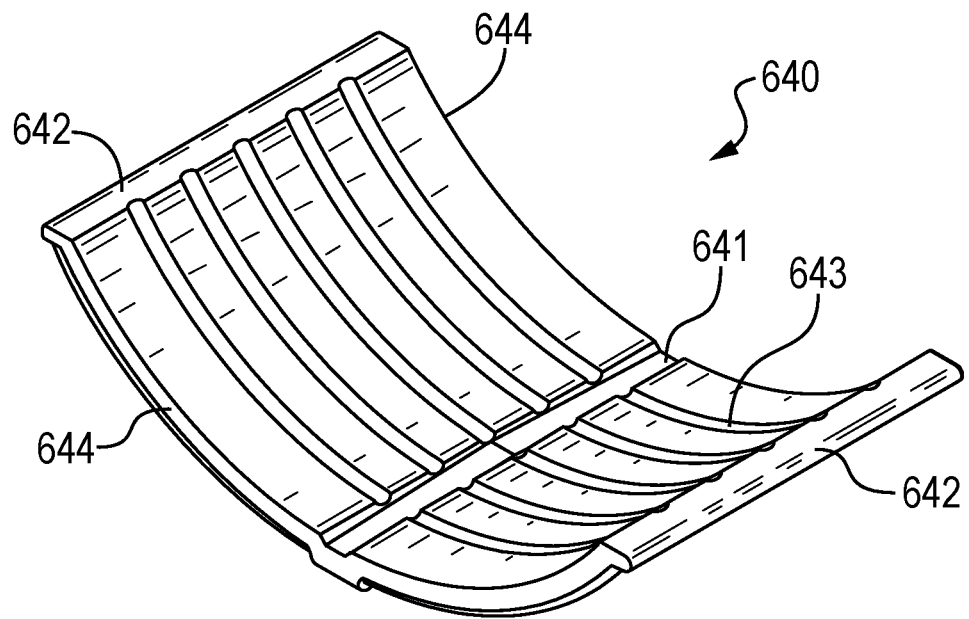
FIG. 8A is a perspective view of the shoe of FIGS. 6A and 6B. Multiple channels are again shown formed in the surface of the shoe.

FIG. 8A is a perspective view of the shoe 640 of FIGS. 6A and 6B.

Figure 8B:
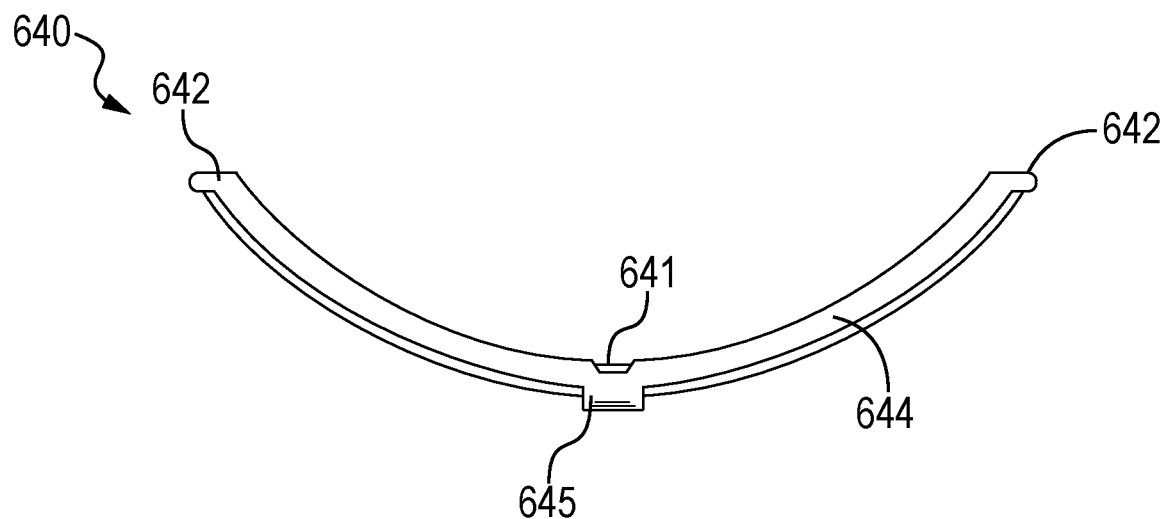
FIG. 8B is a side elevation view of the shoe of FIGS. 6A and 6B.

FIG. 8B is a side elevation view of the shoe 640 of FIGS. 6A and 6B.

Figure 8C:
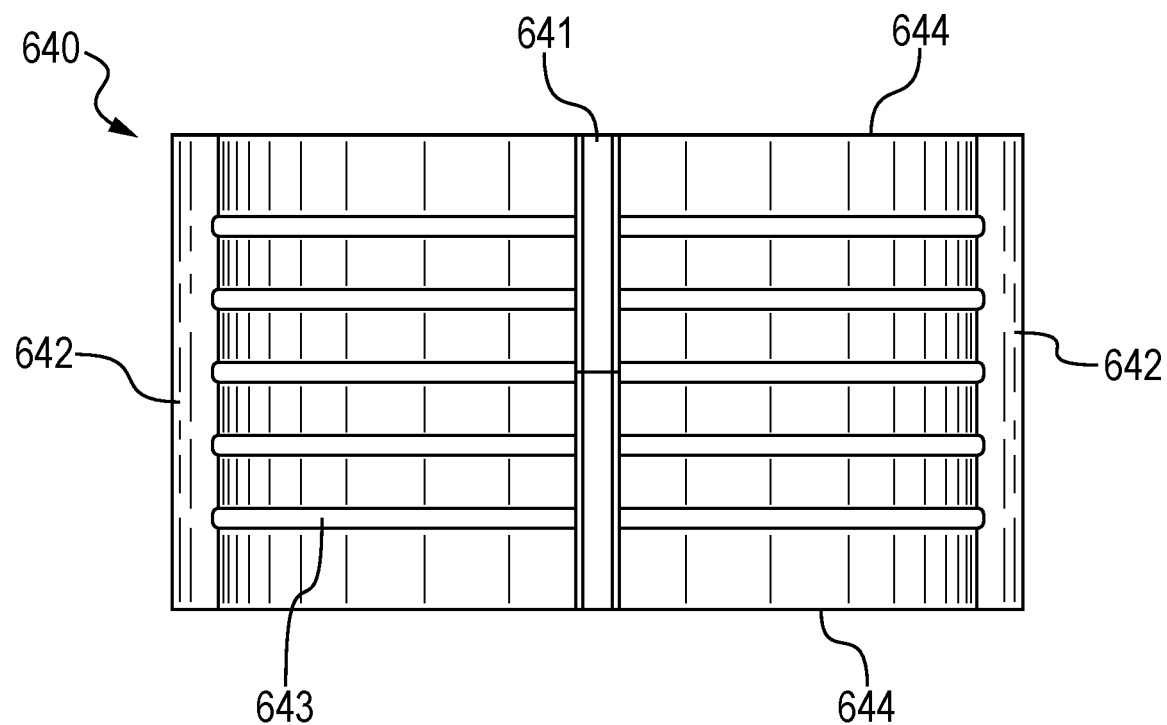
FIG. 8C is a top view of the shoe of FIGS. 6A and 6B.

FIG. 8C is a top view of the shoe of FIGS. 6A and 6B. Multiple channels 641, 643 are again seen in the surface of the shoe 640.

Figure 8D:
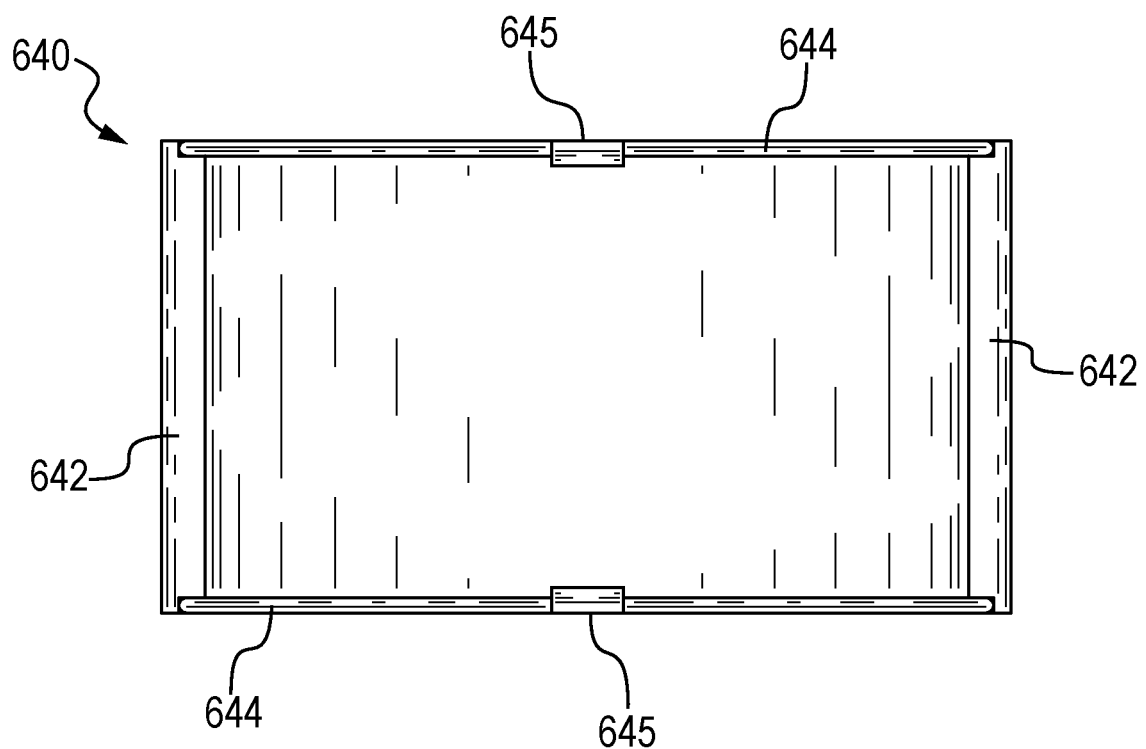
FIG. 8D is a bottom view of the shoe of FIGS. 6A and 6B.

FIG. 8D is a bottom view of the shoe of FIGS. 6A and 6B.

Figure 9A:
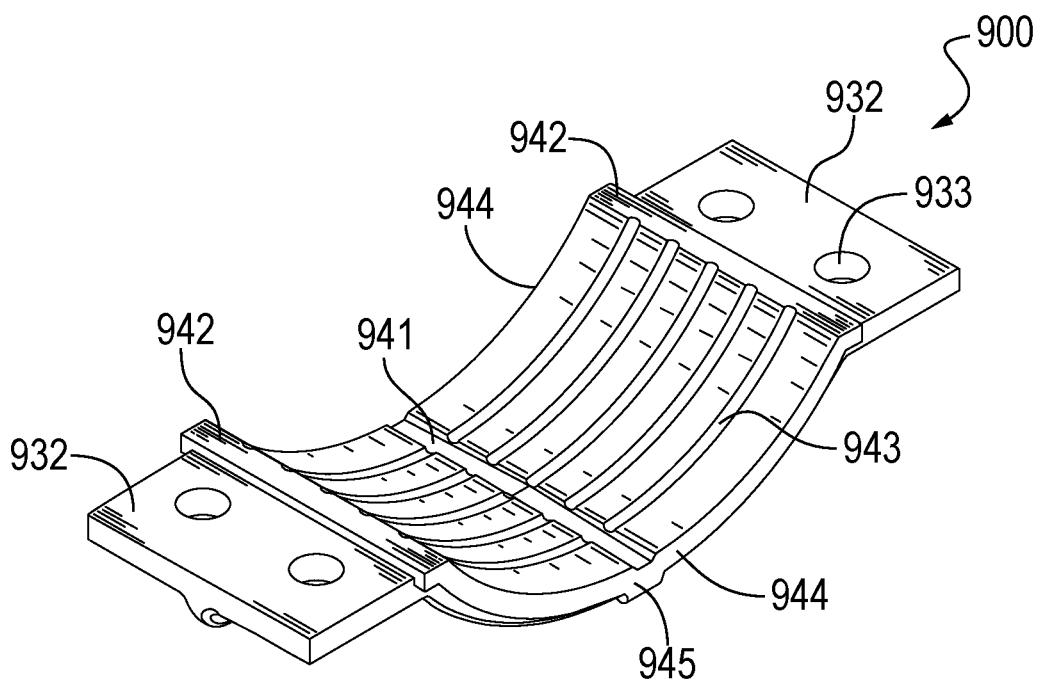
FIG. 9A is a perspective view of a shoe landed onto a saddle, in another alternate embodiment. Here, the shoe again includes a snap-lock feature on opposing sides of the shoe. In this arrangement, the opposing sides extend down, forming shoulders consistent with the embodiment of FIG. 5A.

FIG. 9A is another perspective view of a shoe 940 landed onto (or nested in) a saddle 930. The saddle 930 and shoe 940 may be referred to collectively as 900. In this arrangement, the saddle 930 may be of the same design as the saddle 130 of FIGS. 1A and 1B. In addition, the shoe 940 again includes a snap-lock feature 945 on opposing sides 944, as in the arrangement 600. The snap-locks, or tabs, 945 are configured to snap into mating openings 935 placed along sides 934 of the saddle 930. When snapped into place, the tabs 945 hold the shoe 940 on the saddle 930, preventing the shoe 940 from sliding off of the saddle 930 laterally in the event of movement of a supported pipe joint 400.

In addition to the snap-lock feature 945, the opposing sides 944 extend down, forming shoulders consistent with the embodiment of 500. Thus, the best of both worlds are provided.

Figure 9B:
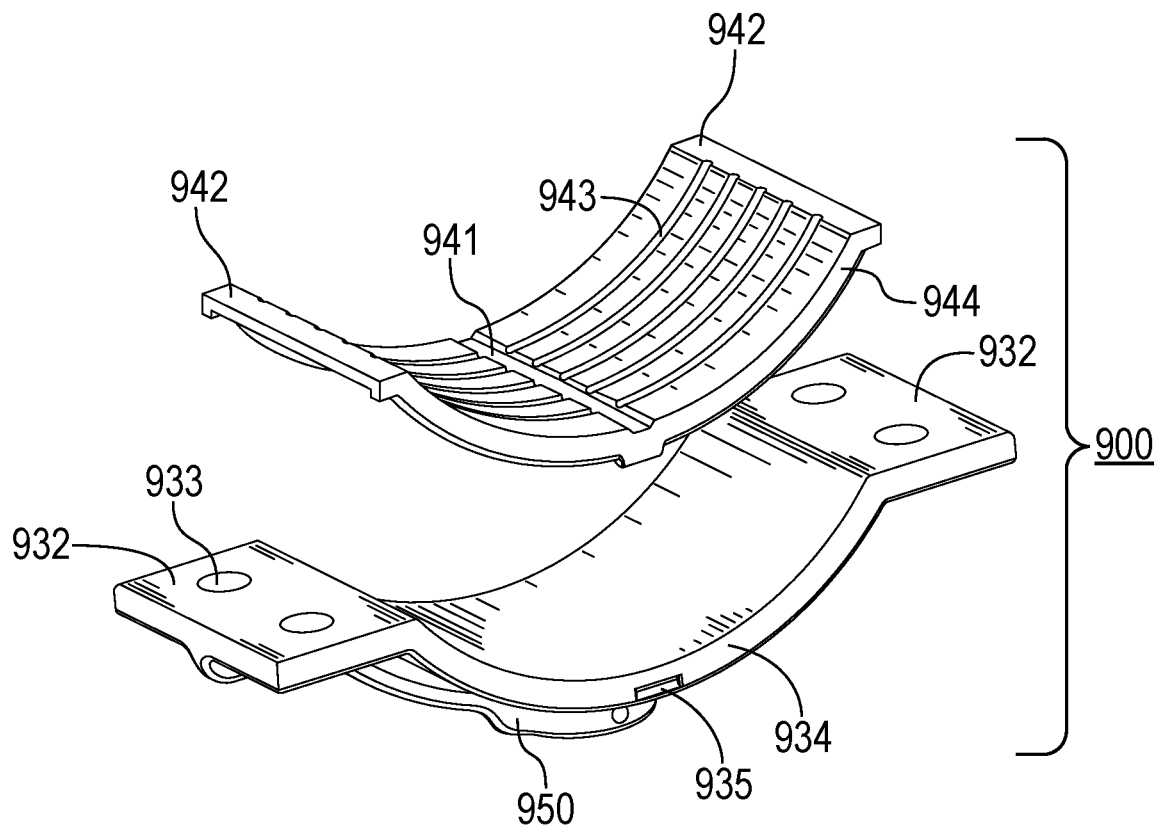
FIG. 9B is another perspective view of the shoe and saddle of FIG. 9A. Here, the components are seen in exploded-apart relation. An opening can be seen along a side of the saddle for receiving the snap-lock tab of the shoe.

FIG. 9B is another perspective view of the shoe and saddle 900 of FIG. 9A. Here, the components are seen in exploded-apart relation. Of interest, the shoe 940 offers not only a central channel 941 that receives moisture, but also a series of parallel channels 943 that follow the concave curvature of the shoe 940. Together, the channels 941, 943 carry moisture away from a supported pipe joint 400.

It is also seen in FIG. 9B that the saddle 930 includes opposing flanges 932, with each flange 932 containing through-openings 933 for receiving U-bolts 160. The saddle 930 also includes a receptacle 950, and opposing sides 934 that contain the mating openings 935.

Figure 9C:
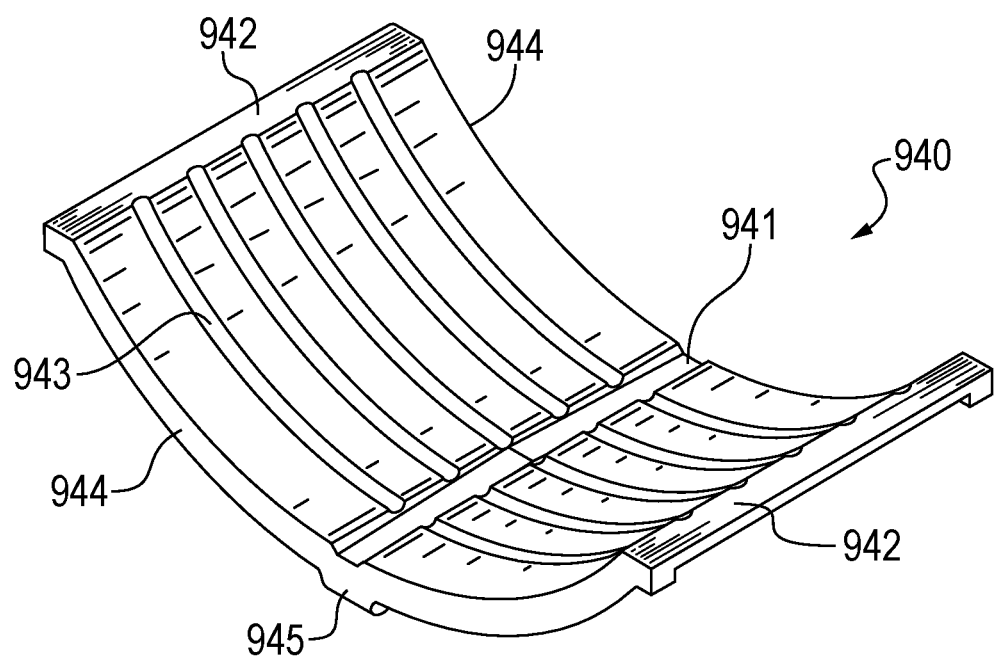
FIG. 9C is a perspective view of the shoe of FIGS. 9A and 9B. Multiple channels are again shown formed in the surface of the shoe.

FIG. 9C is a perspective view of the shoe 940 of FIGS. 9A and 9B.

It is therefore evident that the particular embodiments disclosed above may be altered or modified, and all such variations are considered within the scope and spirit of the application.

In the claims which follow, the word "comprising" is used in its inclusive sense and does not exclude other elements being present. The indefinite articles "a" and "an" before a claim feature do not exclude more than one of the feature being present. Each one of the individual features described here may be used in one or more embodiments and is not, by virtue only of being described here, to be construed as essential to all embodiments as defined by the claims.

I claim:

1. A method of supporting a section of pipe above a ground surface, comprising:
    providing a pipe support system, comprising:
        a pipe base;
        a stud assembly supported along an upper end of the pipe base, the stud assembly having a threaded bolt with a head;
        a saddle supported above the pipe base, the saddle having a concave upper surface, and an under-surface, with a receptacle residing along the under-surface, the receptacle being dimensioned to receive and to gravitationally rest on or over the head of the threaded bolt; and
        a shoe removably nested along the concave upper surface of the saddle, with the shoe being configured to receive a joint of pipe, and with the shoe comprising opposing sides;
    determining a height for supporting a joint of pipe above the ground surface;
    slidably placing the threaded bolt into an inner diameter of the pipe base by landing the stud assembly onto the pipe base;
    landing the receptacle of the saddle onto the head of the threaded bolt so that the saddle and shoe are supported above the pipe base;
    rotating the head of the threaded bolt in order to provide micro-adjustments to the height of the saddle relative to the ground surface; and
    placing the joint of pipe onto the shoe, thereby supporting the joint of pipe above the ground surface.

2. The method of claim 1, further comprising:
    selecting a length of the pipe base in accordance with the height in which the joint of pipe is to be supported above the ground surface.

3. The method of claim 2, wherein:
    the pipe support system further comprises a plurality of tubular bodies having varying lengths; and
    selecting a length of the pipe base in accordance with the height in which the joint of pipe is to be supported above the ground surface comprises selecting a tubular body having a desired length.

4. The method of claim 3, wherein the stud assembly further comprises a flanged housing defining a cylindrical body, the cylindrical body having:
    an outer diameter dimensioned to slidably mate with the base pipe,
    an upper plate forming a flange, and
    a through-opening in the upper plate, wherein the through-opening is configured to threadedly receive the threaded bolt;
    and wherein:
    rotating the head of the threaded bolt comprises turning the threaded bolt within the through-opening of the flanged housing, and
    slidably placing the threaded bolt into an inner diameter of the pipe base comprises landing the flange onto an upper end of the tubular body forming the pipe base.

5. The method of claim 4, wherein:
    each opposing side of the shoe comprises a snap-lock; and
    the saddle also comprises opposing sides, with each opposing side comprising a snap-opening configured to receive a respective snap-lock;

such that when each of said snap-locks is snapped into the respective snap-openings, the shoe is prevented from laterally sliding off the saddle.

6. The method of claim 4, wherein:
each of said opposing sides of the shoe comprises a shoulder, with each shoulder being configured to reside along a side of the saddle to prevent the shoe from sliding off of the saddle.

7. The method of claim 4, wherein:
the shoe includes at least one channel configured to direct water away from a joint of pipe when the joint of pipe is placed onto the shoe; and
the shoe is fabricated from a non-conductive material.

8. The method of claim 4, further comprising at least one clamp disposed about the joint of pipe connectable to the saddle; and
wherein the method further comprises placing the at least one clamp around the joint of pipe by connecting ends of the at least one clamp at opposing ends of the saddle to further secure the joint of pipe onto the saddle.

9. The method of claim 8, wherein:
the at least one clamp comprises two or more U-bolts; and
the two or more U-bolts are connected to the saddle at opposing ends of the saddle by means of U-bolt nuts.

10. The method of claim 4, wherein:
the threaded bolt comprises a collar residing below the head and above a threaded portion of the threaded bolt; and
the receptacle is configured to gravitationally land on the collar, and bearingly rotate on the collar relative to the threaded bolt.

11. The method of claim 10, wherein the pipe support system further comprises:
at least one side opening along the receptacle;
a key threadedly received within each of the at least one side opening, such that when the key is threadedly advanced through the at least one side opening the key will engage the head of the threaded bolt so as to lock the flanged housing to the saddle, thereby preventing relative rotational movement of the flanged housing and the saddle.

12. The method of claim 10, wherein:
the upper plate comprises a flange extending out from the cylindrical body, configured to gravitationally land on an upper end of the pipe base when the cylindrical body slides into the inner diameter of the pipe base;
the head and the collar of the threaded bolt reside above a threaded portion of the threaded bolt; and
the collar is dimensioned to gravitationally support the receptacle and to serve as a bearing surface for the receptacle.

13. The method of claim 10, wherein the pipe support system further comprises:
a nut placed along the threaded portion of the threaded bolt, with the nut residing above the flanged housing; and
a base plate for supporting the base pipe on the ground surface.

14. The method of claim 2, further comprising:
using a key, securing the head in the receptacle to rotationally lock the threaded bolt, thereby preventing relative rotational movement of the threaded bolt to the saddle.

15. A method of replacing a shoe for a pipe support structure, comprising:
providing a pipe support system, comprising:
a pipe base;
a stud assembly having a flanged housing and a threaded bolt having a non-threaded head, with the threaded bolt residing within a through-opening of the flanged housing;
a saddle supported above the pipe base, the saddle having a concave upper surface and a lower surface, with a receptacle residing along the lower surface, with the receptacle being configured to receive and to gravitationally rest over the head;
a first shoe removably nested along the concave upper surface of the saddle, with the saddle and first shoe supporting a joint of pipe over the pipe base and above a ground surface; and
after a period of time, removing the first shoe from the saddle by:
rotating the threaded bolt in a first direction relative to the flanged housing, thereby lowering the saddle and the first shoe away from the joint of pipe;
replacing the first shoe with a new shoe; and
rotating the threaded bolt in a second opposite direction relative to the flanged housing, thereby raising the saddle and the new shoe into engagement with the joint of pipe.

16. The method of claim 15, wherein lowering the saddle and the first shoe away from the joint of pipe comprises rotating the threaded bolt while the saddle and nested shoe remain rotationally stationary.

17. The method of claim 15, wherein lowering the saddle and the nested shoe away from the joint of pipe comprises rotating the flanged housing while the threaded bolt remains rotationally stationary.

18. The method of claim 15, wherein:
the pipe support system further comprises at least one pipe clamp placed over the joint of pipe, with the pipe clamp being releasably attached to the saddle;
and wherein the method further comprises:
removing the pipe clamp from the saddle and from around the joint of pipe before removing the first shoe; and
re-attaching the pipe clamp around the joint of pipe and to the saddle after raising the saddle and the nested new shoe into engagement with the joint of pipe.

19. The method of claim 18, wherein:
each of the first shoe and the new shoe is fabricated from a non-conductive material and the method further comprises:
inspecting the first shoe before replacing.

20. The method of claim 19, further comprising:
using a key, locking the head in the receptacle to prevent relative rotational movement of the stud assembly and the saddle.

21. The method of claim 15, wherein:
the stud assembly further comprises (iii) a collar residing between the non-threaded head and the threaded bolt, and (iv) a nut placed along a threaded portion of the threaded bolt, residing between the non-threaded head and the flanged housing;
the receptacle of the saddle removably resides on the collar, thereby allowing the pipe base and stud assembly to support the saddle as a bearing surface; and
the method further comprises tightening the nut down on the flanged housing.

* * * * *